US010511632B2

(12) United States Patent
Ward et al.

(10) Patent No.: US 10,511,632 B2
(45) Date of Patent: Dec. 17, 2019

(54) INCREMENTAL SECURITY POLICY DEVELOPMENT FOR AN ENTERPRISE NETWORK

(71) Applicant: Microsoft Technology Licensing, LLC, Redmond, WA (US)

(72) Inventors: Michael D. Ward, Issaquah, WA (US); Preston Derek Adam, Woodinville, WA (US); Octavian T. Ureche, Bellevue, WA (US); Vishal Agarwal, Kirkland, WA (US); Narendra S. Acharya, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/449,870

(22) Filed: Mar. 3, 2017

(65) Prior Publication Data

US 2018/0255102 A1  Sep. 6, 2018

(51) Int. Cl.
*H04L 29/06* (2006.01)
(52) U.S. Cl.
CPC .............. *H04L 63/20* (2013.01); *H04L 63/10* (2013.01)
(58) Field of Classification Search
CPC ................................ H04L 63/20; H04L 63/10
See application file for complete search history.

(56) References Cited

U.S. PATENT DOCUMENTS

| 7,565,416 | B1 | 7/2009 | Shafer et al. |
| 7,779,247 | B2 | 8/2010 | Roegner |
| 8,042,150 | B2 | 10/2011 | Haswarey et al. |
| 8,078,713 | B1 | 12/2011 | Kim |
| 8,245,191 | B2 | 8/2012 | Hirose et al. |
| 8,290,841 | B2 | 10/2012 | Beigi et al. |

(Continued)

FOREIGN PATENT DOCUMENTS

WO   2014153366 A1   9/2014

OTHER PUBLICATIONS

"International Search Report & Written Opinion Issued in PCT Application No. PCT/US2018/019799", dated May 16, 2018, 13 Pages.

(Continued)

*Primary Examiner* — Oleg Korsak
(74) *Attorney, Agent, or Firm* — Newport IP, LLC; Mike R. Cicero

(57) ABSTRACT

A system may identify resources such as applications or network locations that are not adequately covered by an enterprise's security policy to notify a network administrator of such deficiencies. An exemplary security policy may allow or deny access to individual functional resources (e.g. computing devices and/or applications) or groups of functional resources to individual data resources (e.g. enterprise network storage locations and/or enterprise data) or groups of data resources. The system may monitor enterprise network activity to identify when a security policy fails to define permissions corresponding to the use of particular resources. In response to identifying such gaps in the security policy, the system may enter policy enforcement event information into a policy learning log. The system may further generate a policy gap notification and transmit this notification to a policy management service to prompt a network administrator to take remedial action if appropriate.

20 Claims, 8 Drawing Sheets

(56) References Cited

U.S. PATENT DOCUMENTS

| | | |
|---|---|---|
| 8,613,070 B1 | 12/2013 | Borzycki et al. |
| 8,650,303 B1 | 2/2014 | Lang et al. |
| 8,799,994 B2 | 8/2014 | Barton et al. |
| 8,819,820 B2 | 8/2014 | Milman et al. |
| 9,369,466 B2 | 6/2016 | Ryerson et al. |
| 9,418,236 B2 | 8/2016 | Cabrera et al. |
| 9,420,002 B1 | 8/2016 | McGovern et al. |
| 9,430,664 B2 | 8/2016 | Adam et al. |
| 9,495,538 B2 | 11/2016 | Schneider et al. |
| 2001/0007133 A1 | 7/2001 | Moriconi et al. |
| 2004/0205342 A1* | 10/2004 | Roegner ............ G06F 21/6218 713/168 |
| 2007/0239859 A1 | 10/2007 | Wilkinson et al. |
| 2008/0016104 A1 | 1/2008 | Kuehr-mclaren et al. |
| 2008/0027860 A1 | 1/2008 | Mullen et al. |
| 2008/0072049 A1 | 3/2008 | Cross et al. |
| 2008/0162581 A1 | 7/2008 | Long et al. |
| 2009/0265754 A1 | 10/2009 | Hinds |
| 2010/0205291 A1 | 8/2010 | Baldry et al. |
| 2010/0274599 A1 | 10/2010 | Deroller |
| 2012/0054841 A1* | 3/2012 | Schultz ................ G06F 21/44 726/6 |
| 2012/0185916 A1 | 7/2012 | Chae et al. |
| 2013/0014212 A1 | 1/2013 | Cohen |
| 2013/0239192 A1 | 9/2013 | Linga et al. |
| 2013/0268642 A1 | 10/2013 | Holland |
| 2014/0196104 A1 | 7/2014 | Chari et al. |
| 2014/0344570 A1 | 11/2014 | Adam et al. |
| 2015/0271296 A1 | 9/2015 | Borzycki et al. |
| 2015/0281281 A1 | 10/2015 | Peterson et al. |
| 2016/0080149 A1 | 3/2016 | Mehta et al. |
| 2016/0088016 A1 | 3/2016 | Emerson et al. |
| 2016/0127327 A1 | 5/2016 | Mehta et al. |
| 2018/0255101 A1 | 9/2018 | Adam et al. |

OTHER PUBLICATIONS

"Determine Allow/Deny List and Application Inventory for Software Restriction Policies", https://technet.microsoft.com/en-us/library/hh994586(v=ws.11).aspx, Published on: Jun. 24, 2013, 2 pages.

Mathers, et al., "Self-service application access and delegated management with Azure Active Directory", https://docs.microsoft.com/en-us/azure/active-directory/active-directory-self-service-application-access, Published on: Sep. 2, 2016, 7 pages.

Vilcinskas, et al., "Conditional access in Azure Active Directory", https://docs.microsoft.com/en-us/azure/active-directory/active-directory-conditional-access, Published on: Dec. 16, 2016, 5 pages.

"Windows Selective Wipe for Device Data Management", https://technet.microsoft.com/en-us/library/dn486874.aspx, Published on: Nov. 1, 2013, 6 pages.

"Introducing FireMon Policy Planner", https://www.firemon.com/products/policy-planner/, Published on: Nov. 14, 2014, 4 pages.

Hu et al., "Assessment of Access Control Systems", In Interagency Report 7316, Sep. 2006, 60 pages.

"Non Final Office Action Issued in U.S. Appl. No. 15/449,847", dated Oct. 18, 2018, 36 Pages.

"Notice of Allowance Issued in U.S. Appl. No. 15/449,847", dated May 1, 2019, 20 Pages.

* cited by examiner

INCREMENTAL SECURITY POLICY DEVELOPMENT FOR AN ENTERPRISE NETWORK

BACKGROUND

Businesses are challenged with developing highly granular security policies for enterprise networks to allow or deny access to enterprise resources at the level of individual devices or even individual applications. One important goal of network administrators is to restrict unauthorized disclosures of enterprise data without negatively impacting worker productivity. For modern businesses operating in the information age, achieving this goal may require security policies to account for highly complex enterprise networks often having hundreds of applications attempting to access thousands of enterprise data resources. Exacerbating this challenge is the increasingly dynamic nature of modern enterprise networks in which new applications and devices are regularly deployed and, therefore, need to be granted access to enterprise data resources. For example, even a perfectly tailored security policy that defines appropriate permissions for each application and each network location that an enterprise's workers currently use may quickly become obsolete as new applications are installed or developed and/or new network locations are deployed. This is especially true in technology companies with the core business function of developing new applications since in such companies it is impractical for network administrators to have knowledge of and account for such new applications during early stages of development.

It is with respect to these considerations and others that the disclosure made herein is presented.

SUMMARY

Techniques described herein provide for incremental security policy development for an enterprise network. Generally described, configurations disclosed herein enable a system to identify resources such as applications or network locations that are not adequately covered by an enterprise's security policy and, ultimately, to notify a network administrator of such deficiencies so that appropriate modifications can be made if warranted. As used herein, a "security policy" refers generally to defined permissions and/or restrictions associated with controlling the flow of enterprise data between various types of computing resources. An exemplary security policy may allow or deny access of individual functional resources (e.g. computing devices and/or applications), or groups of functional resources, to individual data resources (e.g. enterprise network storage locations and/or enterprise data) or groups of data resources. As a specific example, the security policy may include a list of applications which are allowed to access enterprise resources and a default rule to deny access to all other applications, e.g. unless an application is expressly permitted to access an enterprise resource it will be denied access. Preemptively adding resources to an enterprise's security policy by obtaining a priori knowledge of each application and/or computing device deployed by an enterprise as well as each network location these applications and/or computing devices will need access to is impractical for many network administrators. To illustrate this point, consider that a modern business may have numerous departments that may at any time begin to utilize a new application to access enterprise data or create a new storage location to share enterprise data between employees. Since the bounds of a modern enterprise network may evolve due to resources being added continuously over time, maintaining an optimal security policy is akin to chasing a moving target and presents challenges in terms of the required coordination between network administrators and others in the enterprise.

Monitoring enterprise network activity to identify when a security policy fails to define permissions corresponding to the use of particular resources and then reactively updating the security policy provides benefits over preemptively adding resources to an enterprise's security policy. A reactive security policy update may correspond to a resource that is unaddressed by a security policy at a time when the resource is initially deployed on an enterprise network. For example, the security policy may be devoid of any permissions and/or restrictions with respect to the unaddressed resource. Then, the very use of the unaddressed resource on the enterprise network may expose this gap in the security policy's coverage and this gap may be exploited to prompt the enterprise's network administrator(s) to take appropriate action, if warranted.

For illustrative purposes, consider a scenario where a manager installs a new work-related application on her department's computing devices without informing a network administrator or otherwise causing a security policy to be updated with respect to the new application before it is used on the enterprise network. In such a case, the security policy will not include permissions that are specific to the new application and, therefore, enforcement of the security policy may rely on default rules to handle requests from the new application to access and/or disclose enterprise data. For example, a default rule may state that any application that is not expressly permitted to access an enterprise resource will be denied access to the enterprise resource. Alternatively, a default rule may allow applications of a certain type to access the enterprise resource while denying applications of another type access to the enterprise resource, e.g. an application that is published by a trusted publisher may be allowed access by a default rule. Occurrences where default rules are relied upon may then be examined to identify gaps in the security policy's coverage and, if appropriate, to prompt the network administrator(s) to take remedial action.

According to aspects of the present disclosure, a system is provided for prompting incremental security policy development based on an unfamiliar computing resource attempting to access a known enterprise resource. As used herein, an "unfamiliar resource" refers to any computing resource that does not have particularly defined access permissions (including negative permissions, i.e. restrictions) defined within a security policy that are suitable to cover a particular request. In some implementations, the system may obtain security policy data that defines permissions for known resources such as, for example, known business related applications and/or databases known to correspond to an enterprise network. The security policy data may expressly permit a number of known enterprise related applications to access an enterprise database and/or expressly restrict other known applications from accessing the enterprise database. As a specific example, enterprise security policy data may include an application restriction policy (ARP) that is sent to enrolled devices via a mobile device management (MDM) or mobile application management (MAM) authority and that lists known applications and their corresponding access permissions.

In some implementations, the techniques disclosed herein also enable the system to analyze requests to access known enterprise resources to identify gaps in the security policy's coverage such as, for example, instances when the security policy fails to include permissions defining whether to permit or deny a request from an unfamiliar resource. For example, the system may determine that a particular resource which is attempting to access the enterprise database is omitted from the security policy entirely. In response to this determination, the system may generate a log entry to indicate that the security policy data fails to define permissions for the particular resource and also may generate a corresponding policy gap notification so that the security policy can subsequently be reviewed and, if warranted, updated. An exemplary policy gap notification may be configured to prompt policy adjudication for the particular resource due to the security policy lacking permissions for the particular resource. Stated alternatively, the policy gap notification may prompt an enterprise decision maker to consider a resource that is unfamiliar in the sense that the security policy fails to include permissions and/or restrictions that have been specifically tailored to the resource and to decide whether to update the security policy to include permissions and/or restrictions that are specifically tailored to that resource.

To further illustrate these concepts, suppose that the extent of an enterprise security policy is to expressly permit two applications (e.g. applications "A" and "B") to access an enterprise database while expressly restricting another application (e.g. application "C") from accessing the enterprise database. Further suppose that application "D" generates a request to access the enterprise database. Under these circumstances the system may analyze the request to determine that the security policy does not define particular access permissions for application "D" and, therefore, may generate a corresponding log entry and policy gap notification. The policy gap notification may be configured to prompt policy adjudication with respect to application "D." For example, via a policy management service, the policy gap notification may prompt a network administrator to consider application "D" so that, if warranted, the security policy can be updated to permit or deny application "D" to access the enterprise database. Then, if the network administrator decides that application "D" should be allowed to access the enterprise database, she may update the security policy to expressly permit such access. Alternatively, if the network administrator decides that application "D" should be denied access to the enterprise database, she may update the security policy to expressly restrict such access or do no updates and continue to rely on a default rule if there one is in place.

According to additional aspects of the present disclosure, a system is also provided for prompting incremental enterprise security policy development based on a known computing resource, for example, a trusted application, attempting to disclose enterprise data to an unfamiliar resource. Specifically, a known and/or trusted application may attempt to save enterprise data to a network location that is not addressed in a security policy. In such a scenario, the system may obtain security policy data that defines disclosure permissions for the trusted application. Then, the system may analyze a disclosure request that is generated by the trusted application to identify a particular resource to which the trusted application is requesting disclosure of enterprise data. Upon identification of the particular resource, the system may reference the security policy data to determine whether particular disclosure permissions are defined with respect to the particular resource. Based on a determination that the security policy data does not define disclosure permissions for the particular resource, the system may cause an entry to be added to a policy learning log wherein the entry designates the particular resource as an unfamiliar resource. The system may further provide a policy gap notification that corresponds to the log entry to prompt policy adjudication with respect to the unfamiliar resource.

For illustrative purposes, consider a scenario where a security policy defines disclosure permissions for various applications of a productivity suite (e.g. a word processing application) that permit these applications to disclose enterprise data to a number of different enterprise network locations in addition to a number of different enterprise printing devices. Further suppose that a group of employees collaboratively working on a new project decide to generate a new network storage location to save and share enterprise data associated with this new project. For example, the group may create a new folder on a web-based file hosting service (e.g. DROPBOX, MICROSOFT ONEDRIVE, etc.) Here, an attempt by an employee to use the word processing application to save enterprise data to this new network storage location may cause the word processing application to generate a disclosure request. The request can then be analyzed by the system to identify the new network storage location. Once identified, the system may determine that the new network storage location is not addressed by the security policy, e.g. the security policy lacks particular disclosure permissions for the new network location. Subsequent to such a determination, the system may generate an entry in the policy learning log to designate the new network location as an unfamiliar resource. Additionally, the system may generate a policy gap notification to prompt policy adjudication with respect to the new network location.

According to even more aspects of the present disclosure, a system is also provided for determining whether to permit or deny requests to disclose and/or access enterprise data based on a determination of how an unfamiliar application was delivered to a computing device. For example, the unfamiliar application may attempt to access enterprise data that is stored on a known enterprise data resource such as, for example, a shared enterprise network drive and/or folder. In such a scenario, the system may recognize that the unfamiliar application is attempting to access the enterprise data from the known enterprise data resource. Then, the system may analyze the mechanism through which the unfamiliar application was delivered to the computing device to determine whether the unfamiliar application was delivered through a trusted delivery mechanism associated with an enterprise network. For example, the system may determine that the unfamiliar application was delivered to the computing device in response to a user clicking a link in an enterprise-based webpage that has been configured to deliver enterprise approved applications. The system may perform a variety of different actions depending on whether the unfamiliar application is determined to have been delivered through a trusted delivery mechanism. For example, in some implementations the system may permit the unfamiliar application to disclose and/or access enterprise data based on a determination that the unfamiliar application was delivered to a computing device through a trusted delivery mechanism.

For illustrative purposes, consider a scenario where an enterprise-based webpage is configured to enable employees of an enterprise to install and run applications by clicking links on the enterprise-based webpage, e.g. via Microsoft's® ClickOnce technology. Further suppose that an approval process for installing and using applications provides at least some level of confidence to the enterprise network that only work related applications will be delivered through this mechanism of clicking links but that the approval process does not cause (or even require) an enterprise security policy to be updated with respect to each application available. Here, it can be appreciated that an application that has been approved by at least some decision-maker of the enterprise may still be an unfamiliar application in the sense that the security policy may fail to define specific permissions and/or restrictions associated with that application. In such a case, the system may analyze a request that is generated by an application and determine that the security policy does not specifically address the application and, based thereon, may designate the application as an unfamiliar application. Then, the system may further analyze the unfamiliar application to determine that it was delivered to a computing device in response to a user clicking a link on this enterprise-based webpage and, therefore, that this delivery mechanism is a trusted one. Based on this determination, the system may permit the request generated by the unfamiliar application and allow the application to be installed and used despite either the enterprise's security policy lacking particular permissions and/or a default rule of the security policy instructing that unfamiliar applications be restricted from accessing and/or disclosing enterprise data. In some embodiments, the system may further automatically update the security policy to include permissions for the unfamiliar application.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
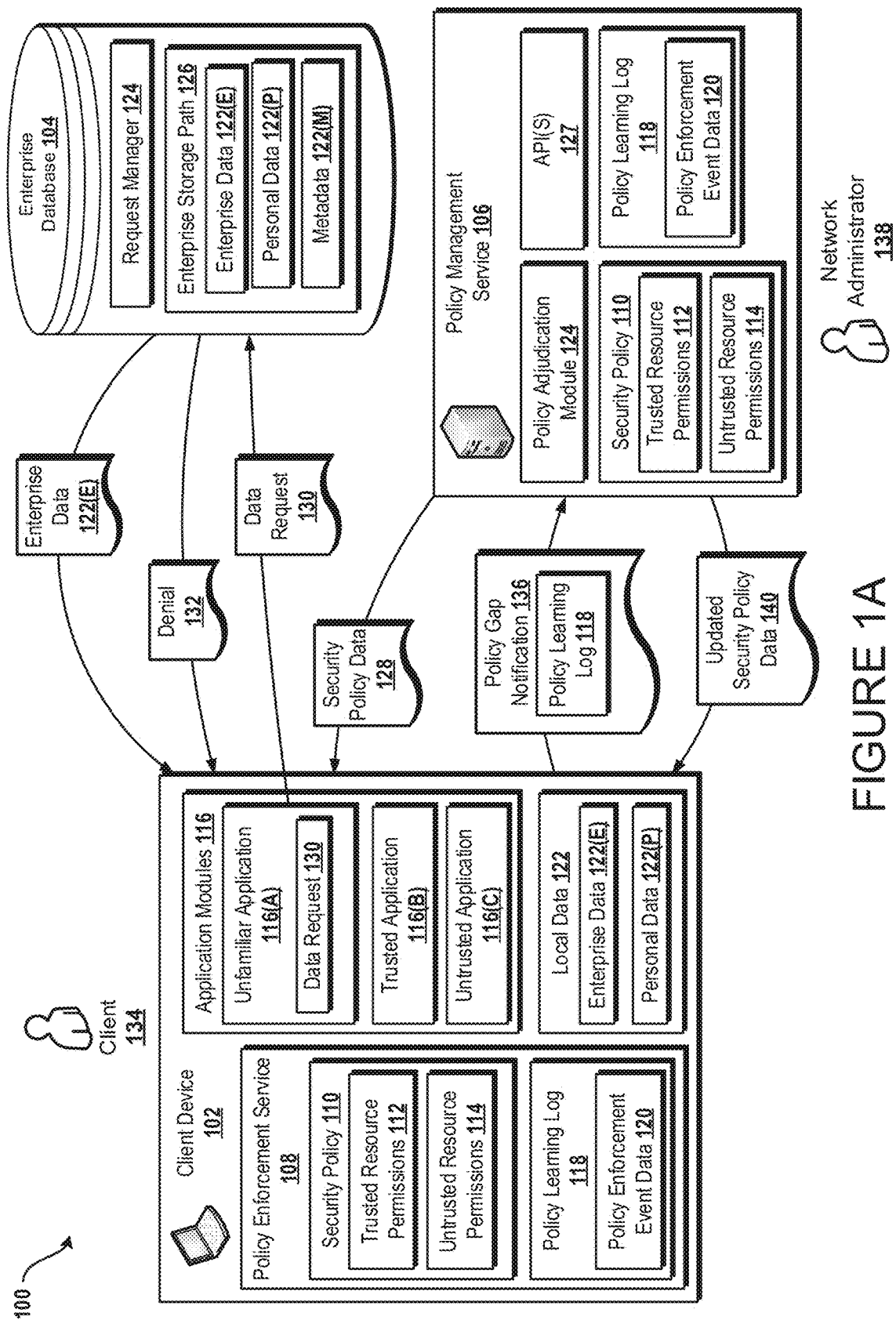
FIG. 1A illustrates an example data flow scenario of a system that prompts incremental developments to an enterprise security policy based on a functional resource attempting to access an enterprise data resource when that functional resource does not have particularly defined access permissions in the enterprise security policy.

The following Detailed Description describes techniques prompting or otherwise providing for incremental security policy development for an enterprise network. Generally described, the techniques disclosed herein enable a system to identify computing resources (e.g. devices, applications, data storage locations, etc.) that are not adequately covered by an enterprise's security policy and, ultimately, to notify a enterprise network administrator of such inadequacies to prompt policy adjudication if warranted. As described above, monitoring enterprise network activity to identify when a security policy fails to define permissions corresponding to the use of particular resources and then reactively updating the enterprise security policy provides benefits over preemptively adding resources to an enterprise's security policy. For example, when a security policy is devoid of any permissions and/or restrictions with respect to some resource, the very use of that resource on the enterprise network may expose this gap in the security policy's coverage. Accordingly, to provide benefits over preemptively adding resources to an enterprise's security policy, techniques disclosed herein enable a computing system to identify gaps within an enterprise's security policy by monitoring resources as they operate on the enterprise network. Upon identifying these gaps within the enterprise's security policy, the system may add a policy enforcement event to a policy learning log and may further generate a policy gap notification to send to a policy management service to, ultimately, notify the appropriate decision-making personnel such as, for example, the enterprise's network administrator(s). As used herein, the term "policy enforcement event" refers generally to any instance in which defined permissions of a security policy fail to include specific permissions with respect to a particular request such that the policy enforcement system is unable to determine whether to grant the request and/or is forced to rely on default rules of the security policy.

For illustrative purposes, consider a scenario where, without informing an enterprise network administrator or otherwise causing a security policy to be updated, an enterprise employee installs a new work-related application on a computing device or creates a new file storage location to store and/or share enterprise data. In such a case, the existing network security policy will not include permissions that are specific to the new application and/or file storage location. Therefore, enforcement of the security policy may rely on default rules to handle access requests that are generated by the new application to access enterprise data and/or disclosure requests that seek to write enterprise data to the new file storage location. Occurrences where the default rule must be relied upon may then be examined to identify gaps in the enterprise security policy's coverage and, if appropriate, to prompt the enterprise network administrator(s) to take remedial action.

Figure 1B:
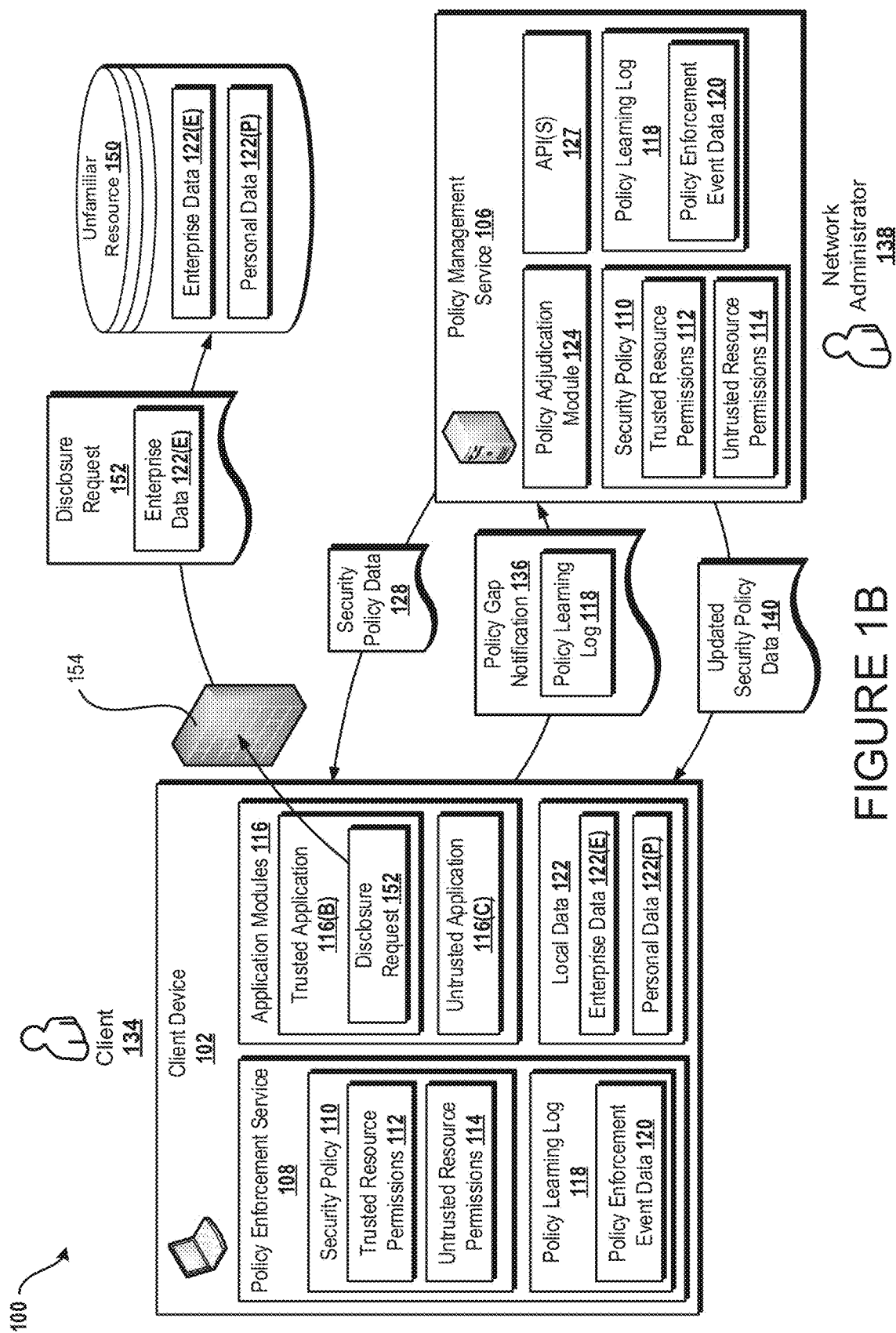
FIG. 1B illustrates an example data flow scenario of a system that prompts incremental developments to an enterprise security policy based on a known and/or trusted computing resource attempting to disclose enterprise data to an unfamiliar resource.
Figure 1C:
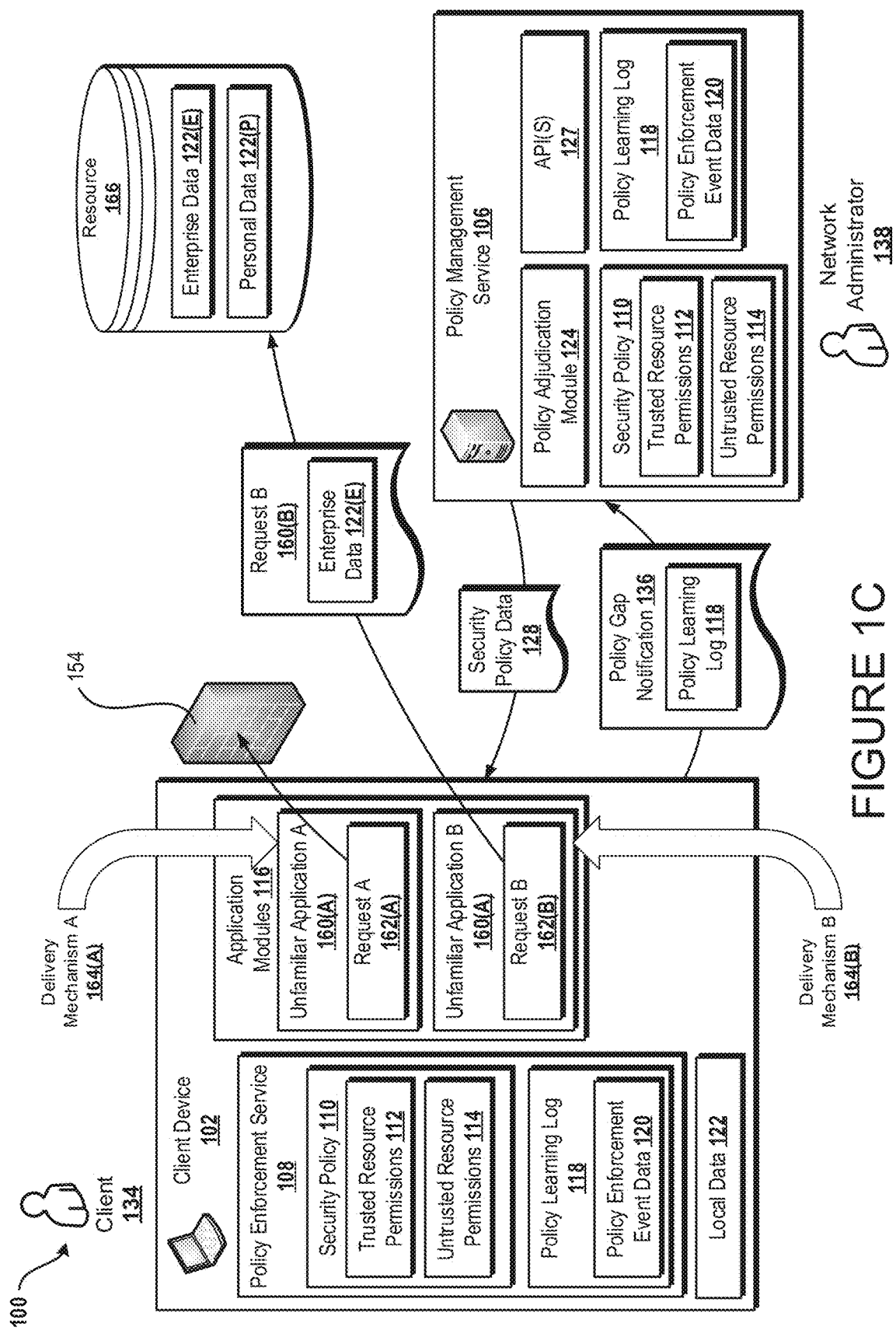
FIG. 1C illustrates an example data flow scenario of a system that dynamically determines whether to permit or deny a request to disclose and/or access enterprise data based on an analysis of the delivery mechanism of an unfamiliar application that has issued the request.

To illustrate aspects of the techniques disclosed herein, FIGS. 1A-1C illustrate various data flow scenarios of systems that identify gaps within an enterprise's security policy and based thereon perform a variety of functions. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1A-1C, may be combined in any order and/or in parallel in accordance with the present disclosure. Other processes and/or operations and/or functionalities described throughout this disclosure shall be interpreted accordingly.

Turning now to FIG. 1A, an example data flow scenario is illustrated with respect to a system 100 that prompts incremental developments to an enterprise's security policy based on identifying a gap in the security policy where an unfamiliar functional resource attempts to access a known data resource. As used herein, the term "functional resource" refers to computing resources that enable manipulation and/or viewing of data and, more specifically, to uniquely identifiable computing devices and computer applications that are executable by such computing devices. As used herein, the term "data resource" refers to data that is stored in computer readable format and/or computing resources that enable storage of data. Exemplary data resources include, but are not limited to, raw enterprise data, metadata, computer files, enterprise network storage paths, non-enterprise network storage paths, physical storage devices, and printers. As illustrated, the system 100 may include a client device 102 that may generate various access requests to access enterprise data stored on an enterprise database 104. The system 100 may further include a policy management service 106 configured to send security policy data to the client device 102.

The client device 102 may include a policy enforcement service 108 that is configured to enforce a security policy 110 that includes trusted resource permissions 112 and/or untrusted resource permissions 114. Trusted resource permissions 112 may include, but are not limited to, a list of trusted applications that are allowed to access and/or disclose enterprise data. For example, the trusted resource permissions 112 may expressly permit two applications (e.g. applications "A" and "B") to access the enterprise database 104. As a more specific but non-limiting example, applications "A" and "B" may belong to a productivity suite that enterprise employees are known to use for genuine business purposes. Untrusted resource permissions 114 may include, but are not limited to, a list of untrusted applications that are restricted from accessing and/or disclosing enterprise data. For example, the untrusted resource permissions 114 may expressly restrict another application (e.g. application "C") from accessing the enterprise database 104. As a more specific but non-limiting example, application "C" may be a known peer-to-peer file sharing service that provides for little or no control over security measures taken downstream once data has been shared. The client device 102 may also include a plurality of application modules 116 that may include one or more of an unfamiliar application 116(A), a trusted application 116(B), or untrusted application 116(C). The client device 102 may further include a policy learning log 118 that is configured to receive, store, and/or transmit policy enforcement event data 120. The client device 102 may further include local data 122 (which may be stored a volatile or nonvolatile manner) that includes one or more of enterprise data 122(E) and/or personal data 122(P). For example, the local data 122 may be stored in a volatile manner on a local cache or in a nonvolatile manner on a local hard drive.

The enterprise database 104 may include a request manager 124 that is configured to determine whether to honor or deny requests sent from the client device 102 in an attempt to access data from an enterprise storage path 126. An exemplary enterprise storage path 126 may include a shared enterprise network location such as, for example, a folder configured to enable enterprise employees to collaborate by sharing enterprise data 122(E). In various implementations, the enterprise storage path 126 may correspond to data storage on one or more enterprise owned servers, one or more servers owned by a third-party web and/or file-hosting services provider, or any combination thereof. In various implementations, the enterprise storage path 126 may define a storage-path that enables access to the enterprise data 122(E), the personal data 122(P), and also any corresponding metadata 122(M). As a specific but non-limiting example, the enterprise storage path 126 may be a shared drive on an intranet corresponding to the enterprise wherein the shared drive is designated by a drive letter and is accessible by multiple remote client devices. In some implementations, the metadata 122(M) may be used to define the enterprise data 122(E) such that data that is tagged as belonging to the enterprise with the metadata 122(M) is treated as enterprise data 122(E) whereas all other data is treated as personal data 122(P).

The policy management service 106 may include a policy adjudication module 124 that is configured to receive the policy learning log 118 to analyze the policy enforcement event data (local data 122) and, ultimately, to prompt policy adjudication with respect to identified policy gaps. The policy management service 106 may further include one or more application programming interfaces 127 ("API 127") that expose an interface through which the policy management service 106 can send data to and/or receive data from the client device 102 and/or the enterprise database 104. Through the use of this data interface and other interfaces, the devices and services described herein can communicate and process data in such a manner as to enable the functionality and/or operations disclosed herein.

With respect to the example data flow scenario of FIG. 1A, the policy management service 106 is shown to transmit security policy data 128 to the client device 102 and, more particularly, to the policy enforcement service 108 that is executable on the client device 102. As described above, exemplary security policy data 128 may define access permissions for a plurality of resources with respect to one or more other resources. For example, the security policy data may define access permissions for functional resources such as, for example, application modules 116 and/or the client device 102. These access permissions may be defined with respect to one or more enterprise data resources such as, for example, the enterprise database 104 and/or enterprise data 122(E). In some instances, the access permissions may define whether to grant or deny requests that are generated by various trusted or untrusted application modules 116 to access the enterprise database 104. In some instances, the access permissions may define whether to grant or deny requests generated by various trusted or untrusted application modules 116 seeking access to the enterprise data 122(E) from any location such as, for example, the local data 122 and/or the enterprise database 104. For example, as described above, in some instances the metadata 122(M) may be used as a tag to designate certain bytes of data as the enterprise data 122(E). Accordingly, the policy enforcement service 108 may analyze metadata 122(M) that corresponds to any data which the application modules 116 are seeking to access regardless of where this data is being stored (e.g. the data could be stored in a volatile cache or a non-volatile local or remote hard drive). Then, based on whether or not such data is tagged as being enterprise data 122(E), the policy enforcement service 108 may determine whether to provide or deny the sought enterprise access. It can be appreciated that access permissions may include both positive permissions that expressly allow a particular resource access to another resource and also negative permissions that expressly deny a particular resource access to another resource.

A data request 130 may be generated that seeks access to an enterprise data resource such as, for example, the enterprise database 104 and/or the enterprise data 120(E) being stored on either the enterprise database 104 or the local data 122. As illustrated, the data request 130 seeks access to the enterprise database 104 and, more particularly, the enterprise data 122(E) that is accessible via the enterprise storage path 126. The data request 130 may then be analyzed by the policy enforcement service 108 to particularly identify the resource that has generated the data request 130. For example, the policy enforcement service 108 may determine that the trusted application 116(B) has generated the data request 130 and, based thereon, further determine that the trusted resource permissions 112 expressly permit the trusted application 116(B) to access the enterprise data 122(E) that is accessible via the enterprise storage path 126. Alternatively, the policy enforcement service 108 may determine that the untrusted application 116(C) has generated the data request 130 and, based thereon further determine that the untrusted resource permissions 114 expressly restrict the untrusted application 116(C) from accessing any enterprise data 122(E) whatsoever regardless of its location.

In some instances, the policy enforcement service 108 may analyze the data request 130 to identify a particular resource that generated the data request 130 and then further determine that the security policy 110, as defined by the security policy data 128, does not define particular access permissions for the particular resource that generated the data request 130. It can be appreciated that FIG. 1A illustrates such an instance as the data request 130 has been generated by the unfamiliar application 116(A). In some instances, the security policy 110 may completely lack any access permissions for the unfamiliar application 116(A) whatsoever. Alternatively, the security policy 110 may include some access permissions for the unfamiliar application 116(A) while lacking particular access permissions that fully define whether to permit or deny the data request 130. For example, the security policy 110 may define some access permissions that expressly permit the unfamiliar application 116(A) to access the enterprise data 122(E) that resides on the local data 122 but may fail to define whether the unfamiliar application 116(A) is permitted to access data that is accessible via the enterprise storage path 126.

Based on the above determination, the policy enforcement service 108 may cause an entry to be added to the policy learning log 118 wherein the entry identifies the unfamiliar application 116(A). The entry may further indicate that the security policy 110 is devoid of particular access permissions with respect to the unfamiliar application 116(A), or that the security policy data lacks particular access permissions with respect to the unfamiliar application 116(A) to the extent necessary to determine whether to permit or deny the data request 130. For example, the security policy 110 may expressly permit the unfamiliar application 116(A) to access one or more enterprise resources that are different than the enterprise database 104 and/or enterprise storage path 126 while remaining silent with respect to the mechanism for granting access to these specific data resources. In some instances, the system may enter policy enforcement event data 120 into the policy learning log 118 to indicate that a default rule was relied upon in determining whether to permit or deny the data request 130. For example, a default rule may be to deny the data request 130 based on the lack of the particular access permissions. In such instances, upon transmitting the data request 130 to the enterprise database 104, the request manager 124 may respond with a denial 132 of the data request 130 to inform the client 134 that the unfamiliar application 116(A) is not permitted to access the enterprise storage path 126. Alternatively, the security policy may balance the interest of not halting productivity over preventing unauthorized disclosures of the enterprise data 122(E) by configuring the default rule to allow the enterprise data request 130 notwithstanding the lack of the particular access permissions while concurrently relying on the policy enforcement event data 122 to flag the policy enforcement event for subsequent review and, if applicable, policy adjudication. In such instances, upon transmitting the data request 130 to the enterprise database 104 the request manager 124 may permit the data request 130 by transmitting the requested enterprise data 122(E) to the unfamiliar application 116(A).

The policy enforcement event data 120 may include varying amounts of information for a resource corresponding to a log event. For example, in this example scenario where the identified resource is the unfamiliar application 116(A), the policy enforcement event data 120 may include one or more of various application properties such as, for example, publisher information, version information, and/or a hash number of an application line release. Alternatively, in a scenario where the identified resource is the client device 102, the policy enforcement event data 120 may include a unique identifier for the client device 102 such as, for example, an international mobile equipment identity (IMEI) number.

As illustrated, the policy enforcement service 108 may also provide a policy gap notification 136 to the policy management service 106 to prompt policy adjudication by a decision-maker of the enterprise such as a network administrator 138. For example, the policy adjudication module 124 may be usable by the network administrator 138 to both view the policy gap notification 136 and/or to access one or both of the security policy 110 or the policy learning log 118. The policy adjudication module 124 may further be usable by the network administrator 138 to generate updated security policy data 140 that defines the particular access permissions that were identified as lacking from the security policy 110 and, ultimately, to send the updated security policy data 140 to the policy enforcement service 108. Stated alternatively, the policy gap notification 136 may prompt an enterprise decision maker to consider a resource that is unfamiliar in the sense that the security policy fails to include permissions and/or restrictions that are specifically tailored to the resource and to decide whether to update the security policy to include permissions and/or restrictions that are specifically tailored to that resource.

Accordingly, it can be appreciated that the policy enforcement service 108 may initially prevent the unfamiliar application 116(A) from accessing the enterprise database 104 based on the security policy 110 failing to define particular access permissions for the unfamiliar application with respect to the enterprise database 104. Then, upon the unfamiliar application being prevented from accessing the enterprise database, a policy enforcement event may be logged within the policy learning log to indicate that such access was blocked. Then this policy learning log may be transmitted to the policy management service 106 to prompt adjudication with respect to this unfamiliar application. Then, at some subsequent time to when the initial data request 130 was generated by the unfamiliar application, the unfamiliar application may again attempt to access the enterprise database and therefore may generate a subsequent request. In some instances, the subsequent request is generated after the updated security policy data 140 has been transmitted to the policy enforcement service 108 wherein the updated security policy data includes particular permissions for this previously unfamiliar application. Then, it can be appreciated that if the updated security policy data 140 expressly permits this application access to the enterprise database, the subsequent request will be granted and the enterprise data will be transferred from the enterprise database 104 to the previously unfamiliar application without the generation of a corresponding policy gap notification.

Turning now to FIG. 1B, an example data flow scenario is illustrated with respect to a system 100 that prompts incremental developments to the security policy 110 based on identified instances of a trusted computing resource attempting to disclose enterprise data to an unfamiliar resource 150. Similarly as illustrated in FIG. 1A, the policy management service 106 is shown to transmit the security policy data 128 to the client device 102. Here, the security policy data 128 includes the trusted resource permissions 112 that define disclosure permissions for one or more trusted computing resources associated with an enterprise network. In particular, the security policy data 128 expressly permits the trusted application 116(B) to disclose the enterprise data 122(E) to one or more other resources identified within the security policy 110. For example, the trusted application 116(B) may be expressly permitted to disclose the enterprise data 122(E) to the enterprise database 104 and/or the enterprise storage path 126 discussed above.

Then, the trusted application 116(B) may generate a disclosure request 152 in an attempt to disclose enterprise data 122(E) to the unfamiliar resource 150. The disclosure request 152 may then be analyzed by the policy enforcement service 108 to identify the unfamiliar resource 150. For example, the policy enforcement service 108 may identify that the unfamiliar resource 150 corresponds to a new folder on a web-based file hosting service such as, for example, Dropbox™ or Microsoft® OneDrive®. Then, the policy enforcement service 108 may determine that the security policy 110 as defined by the security policy data 128 does not define particular disclosure permissions for the unfamiliar resource 150. It can be appreciated that this would likely be the case in the event that a group of employees working together on a new project spontaneously generated this new folder on the web-based file hosting service in order to improve their ability to collaborate. For example, in such an instance the network administrator 138 wouldn't have had the chance to gain a priori knowledge of this new folder and therefore wouldn't have updated the security policy 110 preemptively prior to the employees beginning to use this new folder.

Based on the above determination, the policy enforcement service 108 may cause an entry to be added to the policy learning log 118 wherein the entry identifies the unfamiliar resource 150. The entry may further indicate that the security policy 110 lacks particular access permissions with respect to the unfamiliar resource 150 and that a corresponding policy enforcement event has occurred. In some implementations, the policy enforcement service 108 may determine one or more characteristics associated with the unfamiliar resource 150 and include those characteristics in the entry that is added to the policy learning log 118. For example, the policy enforcement service 108 may determine that the unfamiliar resource is a well-reputed file hosting service that is known to maintain rigorous security standards to prevent misappropriation of their client's data. In contrast, the policy enforcement service 108 may determine that the unfamiliar resource 150 is an unregulated peer-to-peer file sharing service that provides little or no control over security measures for data that engages with its servers.

In some instances, the policy enforcement service 108 may determine whether to permit the trusted application 116(B) to disclose the enterprise data 122(E) to the unfamiliar resource 150 based on these determined characteristics. For example, upon determining that the unfamiliar resource 150 is a well-reputed file hosting service the trusted application 116(B) may be permitted to disclose the enterprise data 122(E). As an alternative example, upon determining that the unfamiliar resource 150 is an unregulated peer-to-peer file sharing service, the trusted application 116(B) may be prevented from disclosing the enterprise data 122(E). Stated plainly, in various instances, the policy enforcement service 108 may decide whether to grant or deny the disclosure request 152 based on characteristics that are determined with respect to the unfamiliar resource 150.

In some instances, the policy enforcement service 108 may determine whether to permit the trusted application 116(B) to disclose the enterprise data 122(E) to the unfamiliar resource 150 based upon a trust level associated with the trusted application 116(B). For example, the application modules 116 may include multiple trusted applications wherein one trusted application (e.g. application "E" with a relatively high trust level designation) is trusted more than another trusted application (e.g. application "F" with a relatively lower trust level designation). Then, in an instance where application "E" generates the disclosure request 152, the policy enforcement service 108 may decide to permit the disclosure request 152 (e.g. allow the enterprise data 122(E) to be transmitted to the unfamiliar resource 150) whereas in an instance where the application "F" generates the disclosure request 152, the policy enforcement service 108 may decide to deny the disclosure request 152 (e.g. block the enterprise data from being transmitted to the unfamiliar resource). For example, the policy enforcement service 108 may erect a firewall 154 to prevent transmission of the enterprise data 122(E). It can be appreciated that although the firewall 154 is illustrated as being external to the client device 102, it is within the scope of the present disclosure for the disclosure request 152 to be blocked either internal to or external from the client device 102.

Similarly as illustrated in FIG. 1A, the policy enforcement service 108 may also provide the policy gap notification 136 to the policy management service 106 to prompt a decision maker of the enterprise to perform policy adjudication with respect to the unfamiliar resource. For example, the network administrator 138 may be prompted via the policy adjudication module 124 to consider whether or not particular disclosure permissions should be generated with respect to the unfamiliar resource 150. Then, in the event that the network administrator 138 decides to update the security policy 110, the policy adjudication module 124 and/or the policy management service 106 may send the updated security policy data 142 to the policy enforcement service 106.

To further illustrate these concepts, consider a scenario where the security policy 110 defines disclosure permissions for the trusted application 116(B) to permit this application to disclose enterprise data to a number of different enterprise network locations and/or enterprise printing devices. Further suppose that an employee unilaterally generates a new network storage location to save and/or share enterprise data, e.g. the employee creates a new folder on a web-based file hosting service (e.g. Dropbox™, Microsoft® OneDrive®, etc.). Then, upon this employee using the trusted application 116(B) to attempt to save the enterprise data 122(E) to this new network storage location, the disclosure request 152 will be created and can then be analyzed by the system to identify the new network storage location. Once identified, the system may determine that the new network storage location is not addressed by the security policy, e.g. the security policy lacks particular disclosure permissions for the new network location. Based on this identified void in the security policy, the system may generate an entry in the policy learning log to designate the new network location as an unfamiliar resource. Additionally, the system may generate a policy gap notification to prompt policy adjudication with respect to the new network location. Accordingly, in some instances the system may be deployed to perform "network discovery" functionality to identify network locations that are "unfamiliar" based on the security policy 110 and, ultimately, to prompt a decision-maker to determine whether to add these identified networks and/or storage locations to the security policy 110 to expressly permit or restrict access thereto.

In some instances, the system may determine a unique identifier corresponding to the unfamiliar resource 150 which may further generate default disclosure permissions for the unfamiliar resource. For example, the system may identify the unique data storage path that corresponds to the unfamiliar resource 150 such as, for example, by analyzing a share link that is configured to provide access to the unfamiliar resource 150. It can be appreciated that such share links are commonly used as an expeditious way to provide access to shared network drives that are hosted by a third-party file hosting services such as, for example, Dropbox™ or Microsoft® OneDrive®. In some instances, generating the default disclosure permissions may be based on one or more characteristics identified with respect to the unfamiliar resource 150. For example, the system may determine that the unfamiliar resource 150 is hosted by a trusted service such as Microsoft® OneDrive® and, therefore, may generate default permissions which permit the disclosure request 150. Alternatively, the system may determine that the unfamiliar resource 150 is a peer-to-peer sharing service with poor security protocols and, therefore, may generate default permissions which deny the disclosure request 150. Upon generation of the default permissions, the system may be configured to cause these default permissions to be applied on a permanent basis such as, for example, by automatically updating the security policy to include such default permissions. Alternatively, upon generation of the default permissions, the system may be configured to cause these default permissions to be applied on a temporary basis such as, for example, for a predetermined period of time and/or until formal policy adjudication is performed via the policy adjudication module 124. It can be appreciated that the default permissions created by the system may be based on any relevant characteristics determinable with respect to the unfamiliar resource 150.

In some embodiments, the system may be configured to push at least a portion of the security policy data 128 to the unfamiliar resource 150 to cause the unfamiliar resource 150 to segregate the enterprise data based on a mobile device management (MDM) protocol. For example, consider a scenario where the unfamiliar resource 150 is the computing device that is capable of implementing an MDM protocol as well as confirming to some other device that such an MDM protocol is being implemented. In such a scenario, upon determining that the security policy data 128 fails to define the particular disclosure permissions for the unfamiliar resource 150, one or both of the policy management service 106 and/or the policy enforcement service 108 may be configured to transmit the security policy 110 or a portion thereof to the unfamiliar resource 150. The unfamiliar resource may then segregate the enterprise data from other types of data based on one or more of the security policy 110 and/or the MDM protocols to be implemented by the unfamiliar resource 150.

In some instances, the system may be configured to identify a disclosure mechanism that corresponds to the unfamiliar resource 150 and, based thereon, determine whether to permit or deny the disclosure request 152. For example, in a scenario in which the unfamiliar resource 150 corresponds to a particular web-based file sharing service (e.g. hosting service "A"), the system may identify that the disclosure request 152 is attempting to disclose data to the hosting service "A" and then determine that this hosting service "A" does not correspond to one or more approved disclosure mechanisms of the enterprise. Accordingly, the system may prevent disclosure of the enterprise data via this first disclosure mechanism that corresponds to the disclosure request 152. For example, in response to identifying that the request 152 is attempting to transmit data to an unapproved file hosting service, the system may simply prevent the transfer of the enterprise data 122(E). Furthermore, in some instances, the system may be configured to provide instructions to the client device 102 that communicates to the client 134 how to use a second disclosure mechanism that is approved. For example, suppose that while hosting service "A" is not approved for use by the enterprise, several other hosting services including hosting service "B" are approved for use by the enterprise. In such an instance, the system may be configured to respond to the disclosure request 150 with instructions on how to utilize the hosting service "B," or any other approved disclosure mechanism, to disclose the same enterprise data that corresponds to the disclosure request 152.

It should be appreciated that although the data flow scenario illustrated in FIG. 1B corresponds to an adjudicated computer program (e.g. a computer program that has been explicitly considered and added to the security policy 110) attempting to disclose data to an unfamiliar resource, it is within the scope of the present disclosure for the techniques described herein to be triggered based on an adjudicated computing device attempting to disclose data to an unfamiliar resource.

Turning now to FIG. 1C, an example data flow scenario is illustrated with respect to a system 100 that dynamically determines whether to permit or deny requests to disclose and/or access enterprise data 122(E) based on the delivery mechanism of an unfamiliar application issuing the requests for enterprise data. Similarly as illustrated in FIG. 1A, the policy management service 106 is shown to transmit the security policy data 128 to the policy enforcement service 108. Here, the trusted resource permissions 112 of the enterprise security policy define one or more trusted delivery mechanisms that may be used to assign a level of trust to unfamiliar applications. For example, unfamiliar application "A" 160(A) may generate a request 162(A) that seeks to access and/or disclose enterprise data 122(E) from/to a resource 166 that may be a familiar resource or an unfamiliar resource. The policy enforcement service 108 may analyze the request to identify the application "A" and, based on an analysis of the security policy 110 with respect to the application "A," the policy enforcement service 108 may further determine that the application "A" is an unfamiliar application.

The policy enforcement service 108 may then further analyze the application "A" to identify a delivery mechanism through which the application was delivered to the computing device 102. As illustrated, the policy enforcement service may determine that the unfamiliar application "A" 160(A) was delivered to the client device 102 via a delivery mechanism "A" 164(A). In some instances, determining the delivery mechanism may correspond to determining the source of origin of the unfamiliar application and treating requests generated by various unfamiliar applications differently depending on their corresponding source of origin. In particular, requests may be treated differently based upon a determined author of the unfamiliar application, publisher of the unfamiliar application, distributor of the unfamiliar application, and/or any other characteristic indicative of a source of origin. For example, the policy enforcement service 108 may determine that the unfamiliar application "A" 160(A) was obtained by the client 134 through an application distribution website that includes various share-ware and/or free-ware type applications that are known to be loosely governed in terms of security protocols. The policy enforcement service 108 may determine that the delivery mechanism "A" 164(A) does not correspond to the one or more trusted delivery mechanisms that are associated with the enterprise network as defined in the trusted resource permissions 112. Then, based on the delivery mechanism not corresponding to a trusted delivery mechanism, the policy enforcement service 108 may deny the request "A" 162(A) to prevent the unfamiliar application "A" 160(A) from disclosing and/or accessing the enterprise data 122(E) from/to the resource 166.

In some instances, determining the delivery mechanism may include determining a specific technology used to transmit the unfamiliar application to the client device 102. For example, as illustrated, the policy enforcement service 108 may determine that the unfamiliar application "B" 160(B) was delivered to the client device 102 via a particular transmission technology labeled as delivery mechanism "B" 164(B). As a specific example, suppose that the unfamiliar application "B" 160(B) was delivered to the client device 102 via an enterprise-based webpage that is configured to enable employees of an enterprise to install and run applications by simply clicking a particular link on the enterprise-based webpage, e.g. via Microsoft's® ClickOnce technology. Further suppose that an approval process provides at least some level of confidence that only work related applications will be delivered through delivery mechanism "B" 164(B) but that the approval process does not cause (or even require) the security policy 110 to be updated with respect to each application available via delivery mechanism "B" 164(B). Thus, it can be appreciated that the unfamiliar application "B" 160(B) may have been approved for use on the client device 102 despite the security policy 110 lacking particular permissions with respect to this application. In the interest of not hampering employee productivity, the policy enforcement service 108 may permit the request "B" 162(B) that is generated by the unfamiliar application "B" 160(B) despite the security policy 110 failing to explicitly define whether this application should be able to disclose enterprise data 122(E) outside of an enterprise network (e.g. to a third-party web-based file hosting service) and/or access enterprise data 122(E) from an enterprise network (e.g. access the enterprise database 104).

In such a case, the policy enforcement service 108 may analyze the request "B" 162(B) that is generated by application "B" 160(B) to determine that the security policy 110 does not specifically address application "B" 160(B) and, based thereon, may designate application "B" 160(B) as an unfamiliar application. Then, the policy enforcement service 108 may further analyze the unfamiliar application "B" 160(B) to determine that it was delivered to a computing device via delivery mechanism B 164(B) and, therefore, that it was delivered through a trusted delivery mechanism as defined by the trusted resource permissions 112. Based on this determination, the policy enforcement service 108 may permit the request "B" 162(B) that is generated by application "B" 160(B) despite the identified gap in the security policy 110.

In some instances, the system may be configured to automatically update the security policy 110 to include permissions associated with the application "B" 160(B) based on a determination that it was delivered through a trusted delivery mechanism. In this way, the system may mitigate the need for a human enterprise decision-maker to specifically consider application "B" 160(B) with respect to the security policy 110. In some instances, the system may be configured to designate the application "B" 160(B) as being expected from the security policy 110 based on the determination that it was delivered through a trusted delivery mechanism. For example, the system may flag application "B" 160(B) within an exemptions list of the security policy 110 that indicates one or more resources which the policy enforcement service 108 is to consider as being exempt from having the security policy 110 applied thereto.

Figure 2:
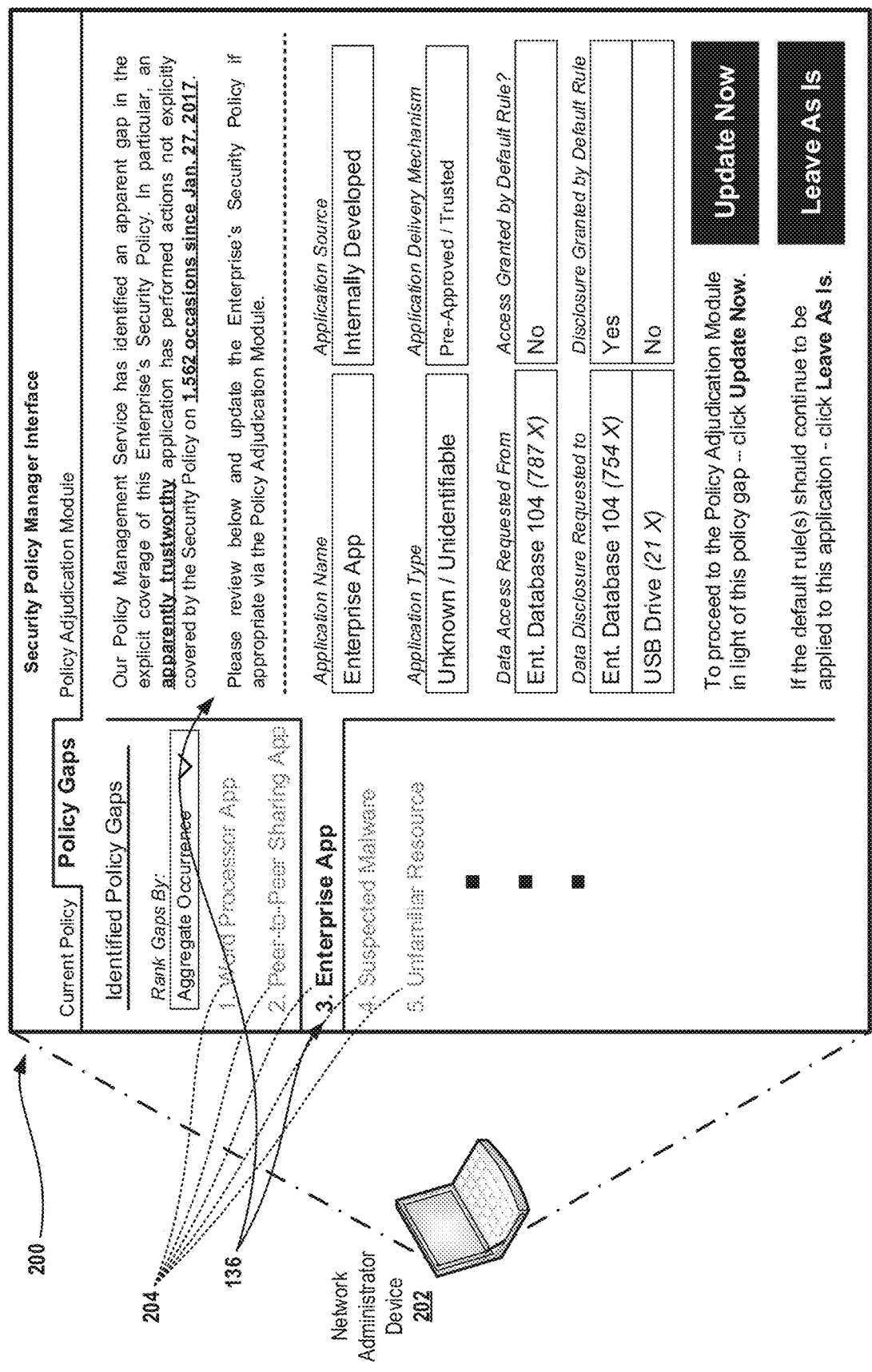
FIG. 2 illustrates aspects of a user interface that can be displayed on a user device to communicate details of a Policy Gap Notification as described herein. This example user interface can be displayed on a variety of device types, such as a desktop computer, mobile device or a combination of devices.

FIG. 2 illustrates aspects of a user interface 200 that can be displayed on a network administrator device 202 to communicate details of a Policy Gap Notification as described herein. In the illustrated scenario, the policy gap notification 136 along with the policy learning log 118 generated at the client device 102 has been sent to the policy management service 106 to communicate details surrounding apparent gaps in the security policy 110 identified by the policy enforcement service 108. For example, as illustrated, the policy gap notification 136 communicates details of a gap in the security policy 110 with respect to an internally developed enterprise application, hereinafter referred to as "Enterprise App." In some embodiments, the user interface 200 may expose various aspects of the policy management service 106 through the APIs 127. For example, a series of tabs near the top of the UI 200 may enable the network administrator 138 to view a current version of the security policy 110, policy gaps corresponding to the policy gap notification 136 and/or an aggregation of many policy gap notifications received from numerous other client devices, and/or update the security policy 110 via the policy adjudication module 124.

With respect to the illustrated Policy Gaps tab, the policy management service 106 may in some instances aggregate numerous policy gap notifications received from numerous devices and display these notifications in a consolidated view. For example, a network administrator 138 may be enabled to select between numerous different resources (including but not limited to applications, devices, and/or storage locations) that have been identified as corresponding to apparent policy gaps 204. In some embodiments, the user interface 200 may be configured to enable the network administrator 138 to select between a variety of different ranking schemes such as, for example, an aggregate amount of similar policy gap notifications. As illustrated, the Enterprise App has been selected and therefore details corresponding to an aggregation of policy gap notifications associated with this application are being displayed on the user interface 200. In particular, the user interface 200 communicates to the network administrator 138 that the policy management service 106 has identified a gap in the coverage of the security policy 110 with respect to the Enterprise App. As illustrated, the user interface 200 further communicates whether or not this application appears to be trustworthy in addition to communicating an aggregate number of events corresponding to the identified policy gap. In some instances, the user interface 200 may further indicate a time period associated with the aggregate number of events, e.g. the user interface 200 may indicate a number of times that Enterprise App has attempted to perform actions which are not explicitly permitted and/or denied based upon the access permissions of the security policy 110 within a specified time period. The aggregate number of events may be determined across a plurality of different client devices on which the policy enforcement service 108 is being used to enforce the security policy 110.

As illustrated, the user interface 200 may communicate various details with respect to resources having associated security policy gaps. For example, for a selected resource the user interface 200 may indicate an application name, an application source, an application type, an application delivery mechanism, and/or any other general relevant characteristic. The user interface 200 may further communicate various details with respect to various actions performed and/or attempted to be performed by the resources for which the policy gaps 204 were identified. For example, as illustrated, the network administrator 138 is being informed that the Enterprise App has attempted to access data from the enterprise database 104, and has attempted to disclose data to the enterprise database 104 as well as to one or more USB drives. In some instances, the user interface 200 may further communicate a number of times that various actions were performed for which the security policy 110 lacked particular permissions. For example, as illustrated, the network administrator 138 is being informed that the Enterprise App has requested to access data from the enterprise database 104 on seven hundred and eighty-seven occasions, et cetera. In some instances, the user interface 200 may further communicate whether or not various access and/or disclosure requests were granted or denied according to default rules set in the security policy 110. For example, the user interface 200 indicates that according to the default rules of the security policy 110 the Enterprise App was not permitted to access enterprise data from the enterprise database 104 or disclose enterprise data to a USB drive. However, the user interface 200 further indicates that according to the default rules of the security policy 110 the Enterprise App was permitted to disclose data to the enterprise database 104. It can be appreciated that informing an enterprise decision-maker of how various attempted actions of a particular resource have been treated according to default rules of the security policy may greatly assist that decision maker in determining whether to maintain the security policy 110 without modification such that the default rules continue to govern how a particular resource is treated by the policy enforcement service or to proceed to the policy adjudication module in light of the particular policy gap in order to update the security policy as needed.

Figure 3:
FIG. 3 illustrates aspects of a user interface that can be displayed on a user device to facilitate policy adjudication with respect to identified policy gaps as described herein. This example user interface can be displayed on a variety of device types, such as a desktop computer, mobile device or a combination of devices.

FIG. 3 illustrates aspects of a user interface 300 that can be displayed on a user device 202 to facilitate policy adjudication with respect to identified policy gaps as described with relation to FIG. 2 and elsewhere herein. More particularly, illustrated is a policy adjudication module interface 300 that enables an enterprise decision-maker to add and/or edit policy data with respect to resources for which gaps in the security policy 110 have been identified. The policy adjudication module interface 300 may enable a user to define various resource characteristics such as, for example, application type, application source, application delivery mechanism, application trust level, and/or any other characteristic relevant to policy adjudication. Furthermore, in some instances the policy adjudication module interface 300 may enable a user to add/define new characteristics with respect to a resource. For example, suppose that the network administrator 138 wishes to create a default rule to grant unfettered access and/or disclosure permissions to any application that is configured to run using container-based virtualization techniques for the purpose of isolating enterprise data. Here, the network administrator 138 may click the Add New Characteristic button as displayed to generate the "Runs in Enterprise Container?" characteristic by defining how the policy enforcement service 108 and/or the policy management service 106 can determine whether or not any particular application possesses this particular characteristic. Then, the network administrator 138 may further define default rules associated with this characteristic so that going forward applications which have this characteristic can be granted the unfettered access. It can be appreciated that the foregoing example is but one of numerous user-definable characteristics and corresponding default actions and, therefore, that the foregoing is not to be construed as limiting.

Additionally, the policy adjudication module interface 300 may display suggested access permissions and/or disclosure permissions with respect to a particular resource such as, for example, the Enterprise App. In some instances, the suggested access permissions and/or disclosure permissions may be determined based on various identifiable application characteristics. For example, in response to determining that the Enterprise App is an internally developed app and that it has been delivered through a preapproved and/or trusted delivery mechanism (as described elsewhere herein), the policy adjudication module 124 may suggest various permissions with respect to known resources. According to the specifically illustrated example, the policy adjudication module 124 has determined various characteristics of the Enterprise App and, based thereon, suggests that the Enterprise App be permitted to access data from all local apps, all local storage, and all enterprise server apps. As further illustrated, the network administrator 138 has accepted one of the suggestions (i.e. the suggested local storage disclosure permission) and has edited numerous other of the suggestions.

In some instances, the policy adjudication module generated suggestions are dynamic with respect to application characteristics such that upon the network administrator adjusting the application characteristics corresponding to a particular resource, the suggested permissions may be dynamically and immediately updated within the policy adjudication module interface 300. For example, as illustrated, the policy adjudication module 124 has been unable to determine a particular trust level, if any, corresponding to the Enterprise App. However, while performing policy adjudication with respect to the Enterprise App, the network administrator 138 may decide that the Enterprise App should be designated with a very high trust level due to its having been internally developed by an IT department. Then, upon designating the newly determined trust level for the Enterprise App, the suggested permissions may be updated within the policy adjudication module interface 300.

In some instances, the suggested access permissions and/or disclosure permissions may be provided by application publishers in the form of recommended security policy rules. For example, the permissions may correspond to a set of fields commonly used within a popular MDM and/or MAM package such as, Microsoft's® Intune®. Then, the system may be configured to accept or deny suggested access permissions based on various characteristics determined with respect to particular applications and/or application publishers.

In various instances, suggested permissions are provided by application publishers in the form of recommended security policy rules which conform to a particular recommendation interface and/or pattern trusted by default and are thereafter temporarily and/or permanently suggested to be implemented. In various other instances, suggested permissions that are provided by application publishers may be trusted only if they are provided by particular publishers that are pre-identified as being trustworthy. In some instances, the system may be configured to identify when a publisher has signed the corresponding suggested access permissions to provide a higher level of trustworthiness as to the source of the suggested access permissions. For example, the publisher corresponding to a popular suite of productivity based applications may generate and transmit along with their applications a corresponding set of suggested security policy rules and may further sign the transmitted application and/or security policy rules to verify their source.

Once the network administrator 138 is satisfied with the state of the defined resource characteristics and corresponding access permissions, a policy update may be generated upon selection of the "Create Policy Update" button to cause the updated security policy data 140 to be transmitted to the client device 102 and/or other devices governed in all or in part by the security policy 110.

Figure 4:
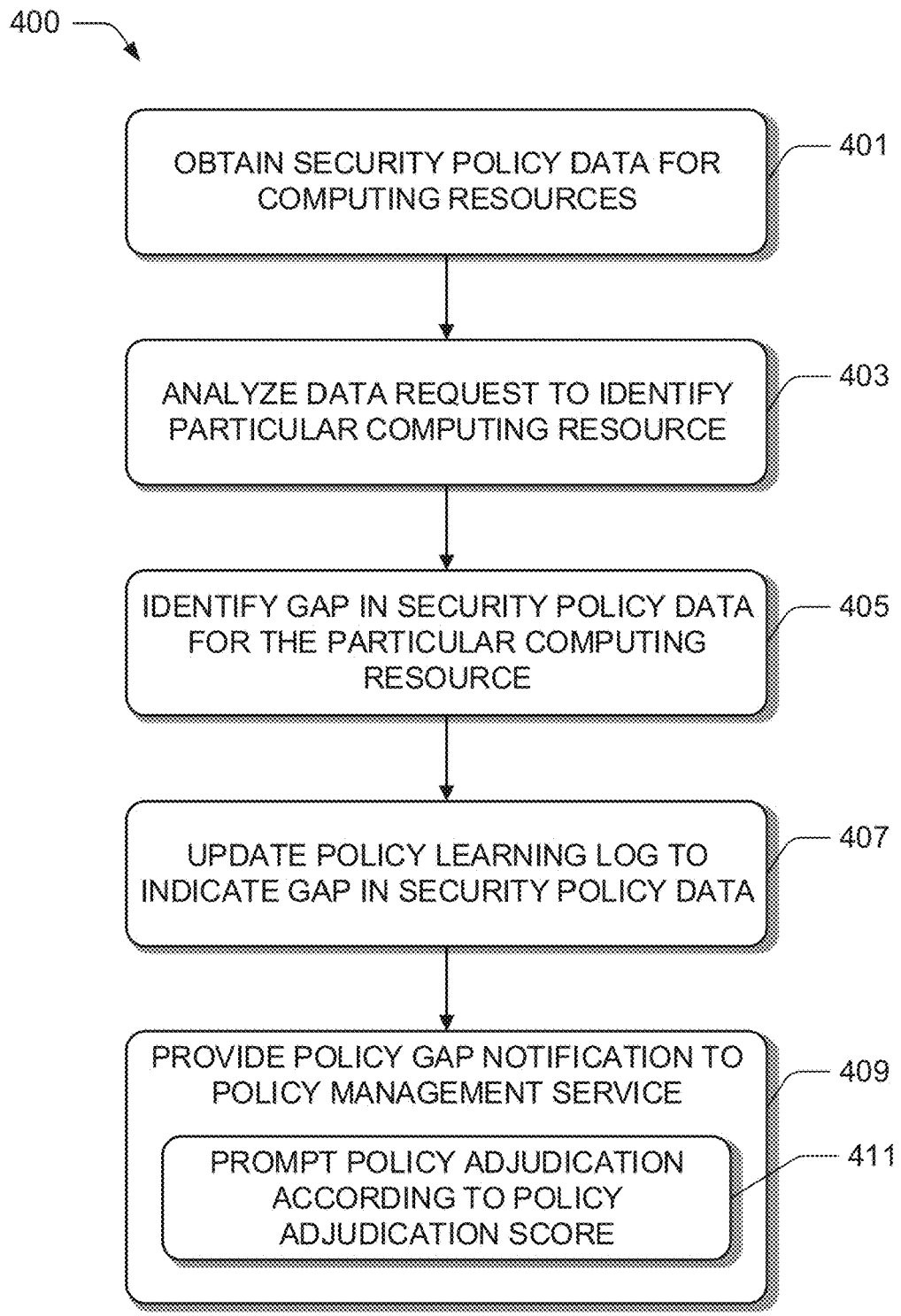
FIG. 4 is a flow diagram of an illustrative process to prompt incremental updates to an enterprise security policy upon identifying a gap in the security policy with respect to a computing resource.

FIG. 4 is a flow diagram of an illustrative process 400 to prompt incremental updates to a security policy upon identifying a gap in the security policy with respect to a computing resource. The process 400 is described with reference to FIGS. 1A-3. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 401, a system may obtain security policy data 128 that defines access permissions and/or disclosure permissions for various computing resources with respect to one or more other resources. In various instances, the computing resources may be functional computing resources as described herein. For example, as described in relation to FIG. 1A, the computing resource may be an application in the security policy data 128 that may define permissions associated with this application with respect to one or more enterprise data resources. Exemplary enterprise data resources include, but are not limited to, the enterprise database 104, the enterprise storage path 126, and/or the enterprise data 122(E). In some implementations, the system may be configured to examine the metadata 122(M) to determine whether any particular bytes of data should be designated/treated as being enterprise data 122(E). According to some implementations, the security policy data 128 may be received from the policy management service 106 by the policy enforcement service 108 that is operating on a client device 102. Although illustrated as a laptop computing device in the FIGS., the client device 102 may be a server computer, a laptop computer, a desktop computer, or any other type of computing device. As described herein, exemplary forms of security policy data 128 include, but are not limited to, any type of mobile application management (MAM) permissions data and/or mobile device management (MDM) permissions data.

At block 403, the system may analyze a data request to identify a particular computing resource that is associated with a particular access and/or disclosure request. For example, in some instances the system may analyze the data request 130 to identify the application 116(A) that is requesting access to the enterprise data resource 104 as illustrated in FIG. 1A. Furthermore, in some instances the system may analyze the disclosure request 152 identify the application 116(B) that is requesting to disclose enterprise data to the unfamiliar resource 150 as illustrated in FIG. 1B. In some implementations, the system may be configured to analyze any request generated by any application on the client device 102 to determine whether such data request is requesting to access enterprise data resources and/or to identify a particular functional resource that has issued the request. Although functional resources are mainly described herein as being applications that are operating on a client device, it can be appreciated that a particular functional resource may itself be a client device. For example, the computing resource that is identified at block 403 may be a newly issued corporate client device that has yet to have been added to the security policy or a new personal device on which the client 134 has attempted access to enterprise email data.

At block 405, the system may identify a gap in the security policy data with respect to the particular computing resource that was identified at block 403. Identifying a gap in the security policy data may include determining the security policy data fails to define particular access permissions for the particular computing resource with respect to some other resource associated with the corresponding request. For example, the system may determine that the security policy data does not define any access permissions whatsoever for a particular functional resource as would be the case in an instance where the particular functional resource is an application that has been newly developed and has never been considered for addition to the security policy 110. Alternatively, the system may determine that the security policy data 128 does define some access permissions for the particular functional resource but still fails to define particular access permissions with respect to the enterprise data resource being requested in the particular data request 130. For example, the security policy data 128 may explicitly permit the particular functional resource to access any enterprise data 122(E) that is stored locally on the client device 102 but may be silent with respect to whether the particular functional resource is permitted to access the enterprise database 104.

At block 407, the system may update a policy learning log with an indication of the gap in the security policy data identified at block 405. For example, the system may cause an entry to be placed into a policy learning log 118 that identifies the particular computing resource identified at block 403 and also indicates that the security policy data 128 fails to define particular access permissions for the particular computing resource with respect to one or more other enterprise resources associated with the request being analyzed. In some implementations, a client-side version of the policy learning log 118 is stored on the client device 102 to enable the policy enforcement service 108 to periodically write new policy enforcement event data 120 into the client-side version of the policy learning log 118. Then, the policy learning log 118 may be periodically transmitted to the policy management service 106. In some implementations, the client-side version of the policy learning log 118 may be aggregated into a server-side version of the policy learning log 118 for de-duplication purposes. For example, the particular computing resource identified at block 403 may be a particular functional resource that is operating across numerous different client devices on which the policy enforcement service 108 is operating. Furthermore, numerous clients operating these devices may all be using this particular functional resource to attempt to access the same enterprise data resource such that similar and/or identical policy enforcement data 120 is being created across multiple devices. Then, as described with relation to FIG. 2, the system may aggregate similar and/or identical policy enforcement data 120 as opposed to prompting adjudication with respect to individual events corresponding to the similar or identical policy for security policy enforcement data 120.

At block 409, the policy gap notification 136 may be provided to the policy management service 106 to prompt an enterprise decision maker to perform policy adjudication for the particular computing resource identified at block 403. For example, with reference to the dataflow scenario of FIG. 1A, the policy gap notification 136 may prompt policy adjudication for the unfamiliar application 116(A) with respect to the enterprise database 104. As an additional example, with reference to the dataflow scenario of FIG. 1B, the policy gap notification may prompt policy adjudication for the unfamiliar resource 150 with respect to the trusted application 116(B). In particular, the policy gap notification 136 may prompt a decision maker to determine whether it is desirable to fill the gap in the security policy data identified at block 405 with respect to the particular computing resource identified at block 403. For example, as illustrated in FIG. 2 the decision maker may be prompted to either proceed to the policy adjudication module in light of the identified policy gap or to indicate that the security policy 110 may be left unmodified such that the default rules will continue to be applied to the particular computing resource identified at block 403.

In some embodiments, providing the policy gap notification 136 at block 409 may include prompting policy adjudication according to a policy adjudication score at block 411. In particular, it can be appreciated that various identified gaps in the security policy data may have various corresponding degrees of urgency with which these gaps should be addressed.

As a first example, suppose that a word processing application that is widely deployed across an enterprise's thousands of employees has been issued an update from the publisher that, for some reason, has caused the policy enforcement service 108 to apply a default rule of blocking this application from accessing the enterprise database 104. It can be appreciated that such a scenario could drastically impact productivity at this enterprise. Further suppose that some other application that is rarely used and/or of little importance to the enterprise has also been blocked on a single occasion by a default rule applied by the policy enforcement service 108. Under these circumstances, it can be appreciated that it may be much more urgent for the policy gap with respect to the word processing application to be addressed than it is for the policy gap with respect to the other more obscure application. Accordingly, in some embodiments the policy management service 106 may be configured to determine an adjudication urgency score associated with a policy gap notification that corresponds to a particular entry in the policy learning log 118 based upon an aggregate number of other entries that bear similarities. Exemplary similarities include, but are not limited to, the entries being associated with the same application, applications from the same publisher, and/or requests to access the same enterprise data resource.

As a second example, suppose those that a particular policy gap notification 136 corresponds to a device that is issued to the chief executive officer (CEO) of the enterprise, or an application operating on this device being denied access to certain enterprise data resources that are accessible only by high-level enterprise executives. Here, it can be appreciated that although there are unlikely to be numerous duplicative instances of policy enforcement event data 120 being entered into the policy learning log 118 of the CEO's device, it may still be highly urgent to address this policy gap to prevent the CEO's productivity from being hampered. Accordingly, in some embodiments the policy management service 106 may be configured to determine an adjudication urgency score associated with a policy gap notification based upon an organizational hierarchy of the enterprise.

In embodiments where an adjudication urgency score is determined with respect to individual or groups of policy gap notifications, the policy management service 106 may be further configured to prompt adjudication according to these adjudication urgency scores. For example, with particular reference to FIG. 2, the security policy gaps may be ranked according to these adjudication urgency scores rather than being ranked by aggregate occurrences as illustrated.

Figure 5:
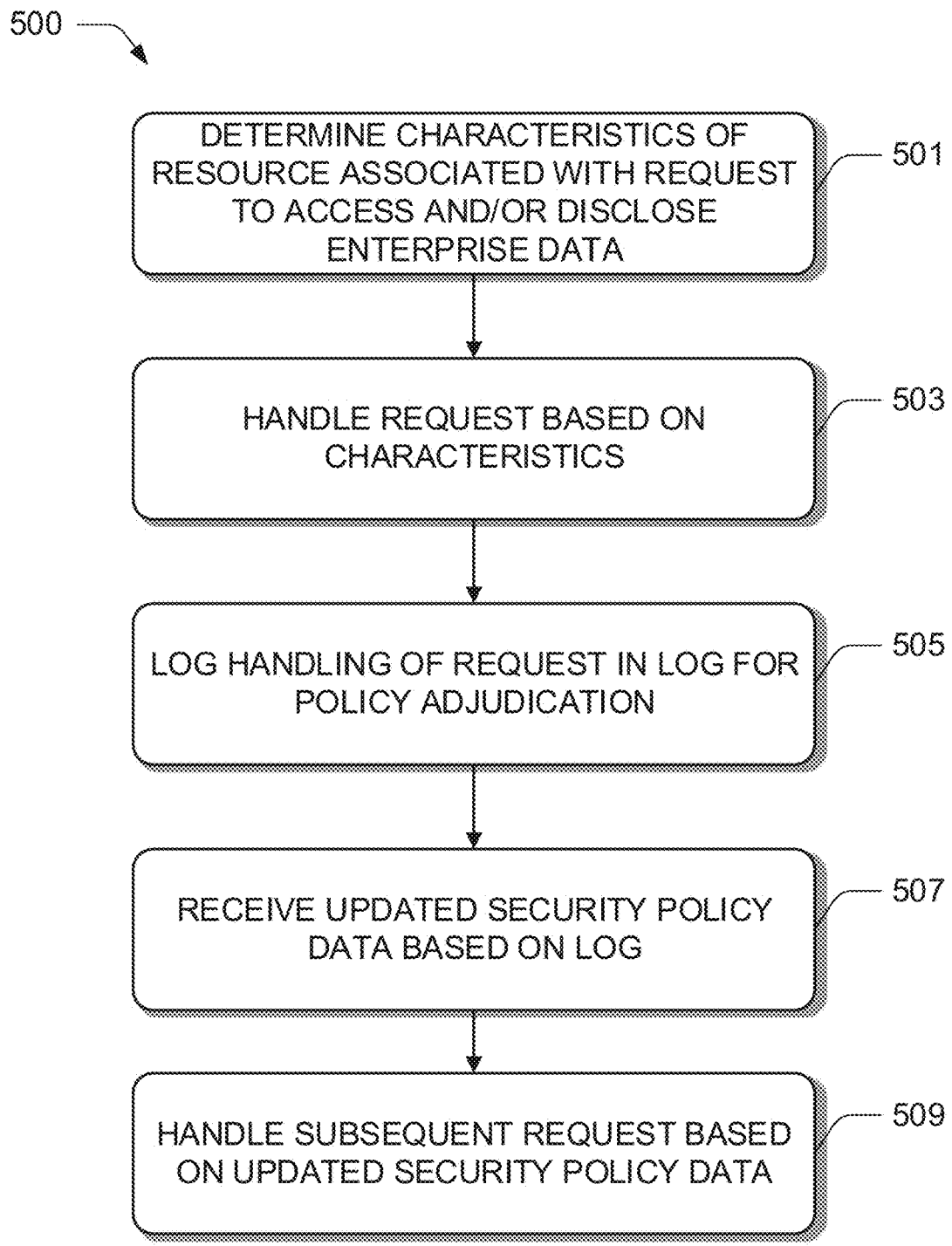
FIG. 5 is a flow diagram of an illustrative process to handle requests to access and/or disclose enterprise data according to characteristics of a resource that is associated with such requests.

FIG. 5 is a flow diagram of an illustrative process 500 to handle requests to access and/or disclose enterprise data according to characteristics of a resource that is associated with such requests.

At block 501, the system may determine characteristics of a resource that is associated with the request to access and/or disclose enterprise data. For example, in a scenario where the resource associated with the request is a functional resource, the system may determine information such as publisher information associated with the functional resource, resource type information that defines in whole or in part the type of resource that the functional resources (e.g. a member of a known and trusted productivity suite), and/or a mechanism through which the functional resource was delivered to a particular client device. Alternatively, in a scenario where the resource associated with the request is a data resource, the system may determine information such as a third-party hosting service associated with the data resource and whether or not such a third-party hosting service is known to implement adequate security protocols to protect their clientele's data.

At block 503, the system may determine how to handle the request based on those characteristics determined at block 501 in lieu of the security policy 110 having particular permissions associated with this resource. For example, in a scenario where the resource associated with the request is a functional resource that has been authored by the same publisher as numerous other functional resources which are approved for use by the enterprise, the system may allow this functional resource to access and/or disclose enterprise data even though the security policy fails to define particular access permissions for this particular functional resource. Alternatively, in a scenario where the resource associated with the request is determined to have the characteristic of being a freeware-type peer-to-peer file sharing resource, the system may block this resource from accessing and/or disclosing any data without this resource being explicitly permitted to do so within the security policy 110.

At block 505, the system may log the handling of this request in the policy learning log to prompt adjudication with respect to the resource associated with the request. Similarly as described above, this log may then be used to prompt policy adjudication with respect to this resource according to other techniques described herein. In some implementations, the system may further make this log accessible by the policy management service to perform policy adjudication via the policy adjudication module.

At block 507, the system may receive updated security policy data that is based on the log updates created at block 505. For example, as described elsewhere herein, the network administrator 138 may perform policy adjudication with respect to this resource and determine that the security policy 110 should be updated in view of the log updates created at block 505.

At block 509, the system may receive a subsequent request that is similar to the request of block 501, but may handle the subsequent request based on the updated security policy data received at block 507 rather than relying upon the characteristics of the resource associated with the request as determined at block 501. For example, although the system may have denied the request at block 503 based on the characteristics determined at block 501, the updated policy data may dictate an alternative outcome such that upon receipt of subsequent requests that are similar to that of block 501, the system will grant rather than deny such subsequent requests.

Figure 6:
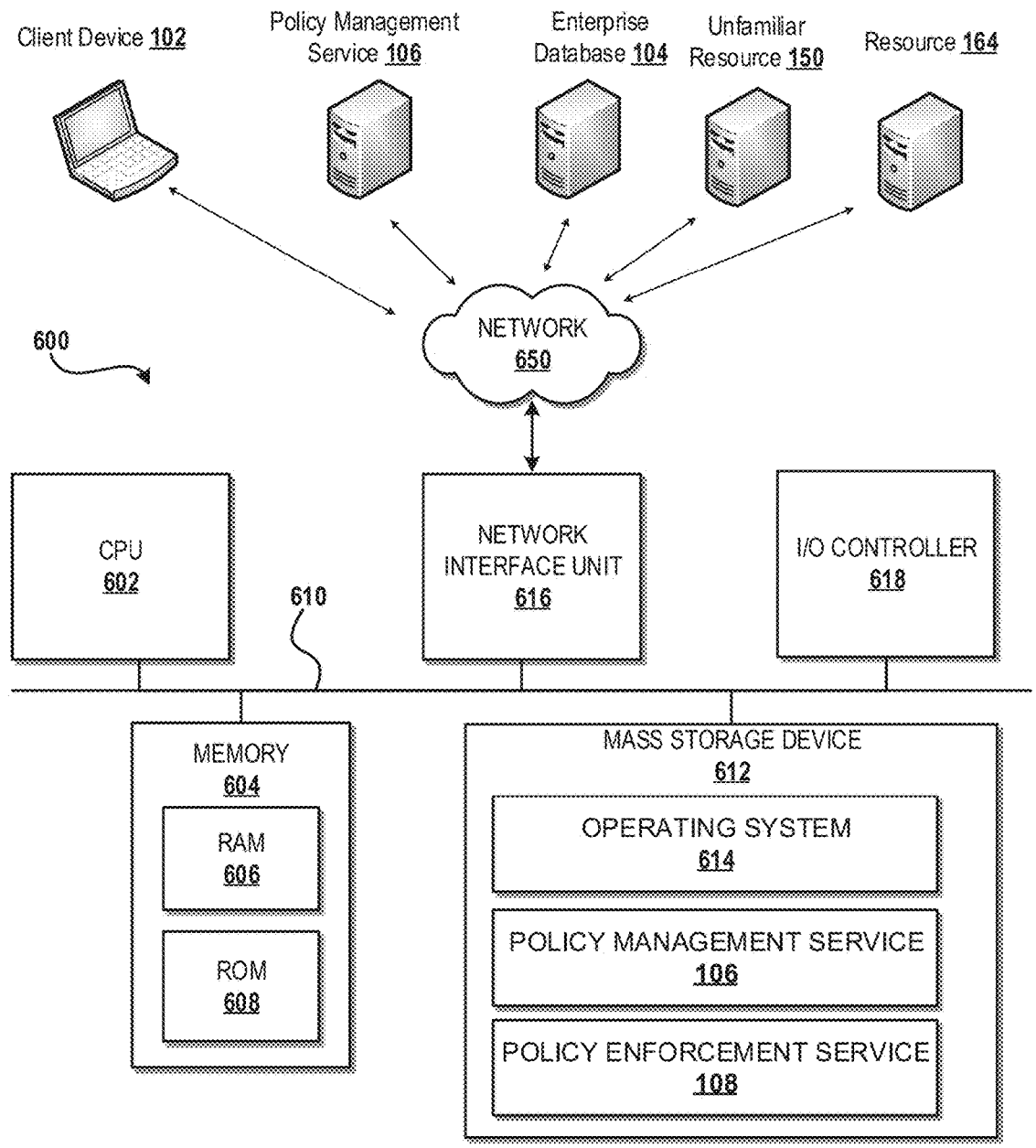
FIG. 6 shows additional details of an example computer architecture for a computer capable of executing the policy enforcement service and/or policy management service for any program components thereof as described herein.

FIG. 6 shows additional details of an example computer architecture 600 for a computer capable of executing the policy management service 106 and/or policy enforcement service 108 and/or any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the policy management service 106 and/or policy enforcement service 108.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable the policy management service 106 and/or policy enforcement service 108 to communicate with one or more of the client device 102, the enterprise database 104, the unfamiliar resource 150, and/or the resource 166.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

EXAMPLE CLAUSES

The disclosure presented herein may be considered in view of the following clauses.

Example Clause A, a system for prompting incremental security policy development for an enterprise network, the system comprising: at least one processor; and at least one memory in communication with the at least one processor, the at least one memory having computer-readable instructions stored thereupon that, when executed by the at least one processor, cause the at least one processor to: obtain security policy data defining access permissions for a plurality of functional resources with respect to an enterprise data resource; analyze a data request to identify a particular functional resource that is requesting access to the enterprise data resource; determine that the security policy data does not define particular access permissions for the particular functional resource with respect to the enterprise data resource; cause an entry that identifies the particular functional resource to be added to a log to indicate that the security policy data does not define the particular access permissions for the particular functional resource; and provide a policy gap notification that corresponds to the entry to a policy management service, wherein the policy gap notification is configured to prompt policy adjudication associated with the particular access permissions for the particular functional resource.

Example Clause B, the system of Example Clause A, wherein the computer-readable instructions further cause the at least one processor to: prevent, at a first time, the particular functional resource from accessing the enterprise data resource based on the security policy data not defining the particular access permissions; and record, within the log, an enforcement event that indicates that the particular functional resource was blocked from accessing the enterprise data resource, wherein the log is accessible by the policy management service for the policy adjudication.

Example Clause C, the system of any one of Example Clauses A through B, wherein the computer-readable instructions further cause the at least one processor to: receive, from the policy management service based on the policy gap notification, updated security policy data corresponding to the policy adjudication, the updated security policy data defining the particular access permissions; and permit, at a second time, the particular functional resource to access the enterprise data resource based on the particular access permissions.

Example Clause D, the system of any one of Example Clauses A through C, wherein the computer-readable instructions further cause the at least one processor to: determine resource characteristics corresponding to the particular functional resource, the resource characteristics including at least one of publisher information, resource type information, or resource delivery mechanism information; and determine, based on the resource characteristics, whether to prevent the particular functional resource from accessing the enterprise data resource in response to the security policy data not defining the particular access permissions.

Example Clause E, the system of any one of Example Clauses A through D, wherein the computer-readable instructions further cause the at least one processor to permit the particular functional resource to access the enterprise data resource based at least in part on the security policy data not defining the particular access permissions.

Example Clause F, the system of any one of Example Clauses A through E, wherein the policy management service is configured to aggregate the entry with a plurality of other entries that are received from a plurality of client devices based on the particular functional resource.

Example Clause G, the system of any one of Example Clauses A through F, wherein the policy management service is configured to determine an adjudication urgency score associated with the policy gap notification based on an aggregated number of other entries that bear similarities with the entry, and wherein the policy management service is configured to prompt the policy adjudication according to the adjudication urgency score.

Example Clause H, the system of any one of Example Clauses A through G, wherein the policy management service is configured to determine an adjudication urgency score associated with the policy gap notification based on an organizational hierarchy of an enterprise corresponding to the enterprise network, and wherein the policy management service is configured to prompt the policy adjudication according to the adjudication urgency score.

While Example Clauses A through H are described above with respect to a system, it is understood in the context of this document that the subject matter of Example Clauses A through G can also be implemented by a device, via a computer-implemented method, and/or via computer-readable storage media.

Example Clause I, a computer-implemented method, comprising: obtaining security policy data defining disclosure permissions for a group of trusted resources associated with an enterprise network, the group of trusted resources including at least a trusted functional resource; analyzing a disclosure request associated with the trusted functional resource to identify a particular resource to which the trusted functional resource is requesting to disclose enterprise data; determining that the security policy data does not define particular disclosure permissions corresponding to the particular resource; causing an entry that designates the particular resource as an unfamiliar resource to be added to a policy learning log; and providing a policy gap notification that corresponds to the entry to a policy management service, wherein the policy gap notification is configured to prompt policy adjudication for generation of the particular disclosure permissions corresponding to the unfamiliar resource.

Example Clause J, the computer-implemented method of Example Clause I, further comprising: determining one or more characteristics associated with the unfamiliar resource; and determining whether to permit the trusted functional resource to disclose the enterprise data to the unfamiliar resource based on the one or more characteristics.

Example Clause K, the computer-implemented method of any one of Example Clauses I through J, wherein the trusted functional resource is permitted to disclose the enterprise data to the unfamiliar resource based on a trust level associated with the trusted functional resource.

Example Clause L, the computer-implemented method of any one of Example Clauses I through K, wherein the trusted functional resource is an adjudicated computer program, and wherein the unfamiliar resource is an unadjudicated data storage resource.

Example Clause M, the computer-implemented method of any one of Example Clauses I through L, further comprising: determining a unique identifier corresponding to the unfamiliar resource to generate default disclosure permissions for the unfamiliar resource; and causing the default disclosure permissions to be applied on at least one of a permanent basis or a temporary basis.

Example Clause N, the computer-implemented method of any one of Example Clauses I through M, further comprising pushing, based on the security policy data not defining the particular disclosure permissions, at least a portion of the security policy data to the unfamiliar resource to cause the unfamiliar resource to segregate the enterprise data based on a mobile device management protocol.

Example Clause O, the computer-implemented method of any one of Example Clauses I through N, further comprising: preventing disclosure of the enterprise data via a first disclosure mechanism that corresponds to the disclosure request; and providing instructions associated with a second disclosure mechanism that are different than the first disclosure mechanism to enable the enterprise data to be disclosed via the second disclosure mechanism.

While Example Clauses I through O are described above with respect to a method, it is understood in the context of this document that the subject matter of Example Clauses H through O can also be implemented by a device, by a system, and/or via computer-readable storage media.

Example Clause P, a computer-readable storage medium having computer-executable instructions stored thereupon which, when executed by one or more processors of a computing device, cause the one or more processors of the computing device to: obtain security policy data defining permissions for a plurality of functional resources that are configured to communicate enterprise data via an enterprise network; analyze a request to identify a particular functional resource that is attempting to disclose the enterprise data outside of the enterprise network, or access the enterprise data from the enterprise network, or both; designate the particular functional resource as an unfamiliar functional resource based on the security policy data not defining particular permissions for the particular functional resource; determine that a delivery mechanism through which the unfamiliar functional resource was delivered to the computing device corresponds to one or more trusted delivery mechanisms associated with the enterprise network; and permit, based on the delivery mechanism corresponding to the one or more trusted delivery mechanisms, the request to enable the unfamiliar functional resource to disclose the enterprise data outside of the enterprise network, or access the enterprise data from the enterprise network, or both.

Example Clause Q, the computer-readable storage medium of Example Clause P, wherein the instructions further cause the one or more processors of the computing device to: cause an entry that identifies the unfamiliar functional resource to be added to a log to indicate that the security policy data does not define the particular access permissions for the particular functional resource; and provide a policy gap notification that corresponds to the entry to a policy management service to prompt policy adjudication for the particular functional resource.

Example Clause R, the computer-readable storage medium of any one of Example Clause P through Q, wherein the instructions further cause the one or more processors of the computing device to automatically update the security policy data to include the particular permissions for the particular functional resource in response to the delivery mechanism corresponding to the one or more trusted delivery mechanisms.

Example Clause S, the computer-readable storage medium of any one of Example Clauses P through R, wherein the instructions further cause the one or more processors of the computing device to designate the particular functional resource as exempt from application of the permissions defined by the security policy data in response to the delivery mechanism corresponding to the one or more trusted delivery mechanisms.

Example Clause T, the computer-readable storage medium of any one of Example Clauses P through S, wherein the delivery mechanism includes the unfamiliar functional resource being delivered to the computing device in response to a user input that selects a link on a webpage of the enterprise network.

While Example Clauses P and T are described above with respect to a system, it is understood in the context of this document that the subject matter of Example Clauses S and T can also be implemented by a device, via a computer-implemented method, and/or via computer-readable storage media.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for prompting incremental security policy development for an enterprise network, the system comprising:
    at least one processor; and
    at least one memory in communication with the at least one processor, the at least one memory having computer-readable instructions stored thereupon that, when executed by the at least one processor, cause the at least one processor to:
        obtain security policy data defining access permissions for a plurality of computing resources with respect to an enterprise data resource;
        analyze a data request to identify a particular computing resource that is requesting access to the enterprise data resource, wherein the particular computing resource is a uniquely identifiable application or device that enables a user to at least one of view data files or manipulate the data files;
        determine that the security policy data lacks both:
            particular access permissions that expressly permit the particular computing resource to access the enterprise data resource, and
            particular access restrictions that expressly restrict the particular computing resource from accessing the enterprise data resource;
        in response to the security policy data lacking both the particular access permissions and the particular access restrictions, cause an entry that identifies the particular computing resource to be added to a policy learning log to indicate that the security policy data lacks both of the particular access permissions and the particular access restrictions for the particular computing resource with respect to the enterprise data resource; and
        provide a policy gap notification that corresponds to the entry to a policy management service, wherein the policy gap notification is configured to prompt policy adjudication associated with the particular access permissions for the particular computing resource with respect to the enterprise data resource.

2. The system of claim 1, wherein the computer-readable instructions further cause the at least one processor to:
    prevent, at a first time, the particular computing resource from accessing the enterprise data resource based on the security policy data not defining the particular access permissions; and
    record, within the policy learning log, an enforcement event that indicates that the particular computing resource was blocked from accessing the enterprise data resource, wherein the policy learning log is accessible by the policy management service for the policy adjudication.

3. The system of claim 2, wherein the computer-readable instructions further cause the at least one processor to:
    receive, from the policy management service based on the policy gap notification, updated security policy data corresponding to the policy adjudication, the updated security policy data defining the particular access permissions; and
    permit, at a second time, the particular computing resource to access the enterprise data resource based on the particular access permissions.

4. The system of claim 1, wherein the computer-readable instructions further cause the at least one processor to:
    determine resource characteristics corresponding to the particular computing resource, the resource characteristics including at least one of publisher information, resource type information, or resource delivery mechanism information; and
    determine, based on the resource characteristics, whether to prevent the particular computing resource from accessing the enterprise data resource in response to the security policy data not defining the particular access permissions.

5. The system of claim 1, wherein the computer-readable instructions further cause the at least one processor to permit the particular computing resource to access the enterprise data resource based at least in part on the security policy data not defining the particular access permissions.

6. The system of claim 1, wherein the policy management service is configured to aggregate the entry with a plurality of other entries that are received from a plurality of client devices based on the particular computing resource.

7. The system of claim 1, wherein the policy management service is configured to determine an adjudication urgency score associated with the policy gap notification based on an aggregated number of other entries that bear similarities with the entry, and wherein the policy management service is configured to prompt the policy adjudication according to the adjudication urgency score.

8. The system of claim 1, wherein the policy management service is configured to determine an adjudication urgency score associated with the policy gap notification based on an organizational hierarchy that indicates a level of one or more employees with an enterprise corresponding to the enterprise network, and wherein the policy management service is configured to prompt the policy adjudication according to the adjudication urgency score.

9. A computer-implemented method, comprising:
obtaining security policy data defining disclosure permissions for a group of trusted resources associated with an enterprise network, the group of trusted resources including at least a trusted computing resource, wherein the trusted computing resource is a uniquely identifiable computing application or computing device;
analyzing a disclosure request associated with the trusted computing resource to identify a particular network resource to which the trusted computing resource is requesting to disclose enterprise data;
determining that the security policy data lacks particular disclosure permissions corresponding to the particular network resource to which the trusted computing resource is requesting to disclose the enterprise data;
responsive to determining that the security policy data lacks the particular disclosure permissions corresponding to the particular network resource, causing an entry that designates the particular network resource as an unfamiliar network resource to be added to a policy learning log; and
providing a policy gap notification that corresponds to the entry to a policy management service, wherein the policy gap notification is configured to prompt policy adjudication for generation of the particular disclosure permissions corresponding to the unfamiliar network resource.

10. The computer-implemented method of claim 9, further comprising:
determining one or more characteristics associated with the unfamiliar network resource; and
determining whether to permit the trusted computing resource to disclose the enterprise data to the unfamiliar network resource based on the one or more characteristics.

11. The computer-implemented method of claim 9, wherein the trusted computing resource is permitted to disclose the enterprise data to the unfamiliar network resource based on a trust level associated with the trusted computing resource.

12. The computer-implemented method of claim 9, wherein the trusted computing resource is an adjudicated computer program, and wherein the unfamiliar network resource is an unadjudicated data storage resource.

13. The computer-implemented method of claim 9, further comprising:
determining a unique identifier corresponding to the unfamiliar network resource to generate default disclosure permissions for the unfamiliar network resource; and
causing the default disclosure permissions to be applied on at least one of a permanent basis or a temporary basis.

14. The computer-implemented method of claim 9, further comprising pushing, based on the security policy data not defining the particular disclosure permissions, at least a portion of the security policy data to the unfamiliar network resource to cause the unfamiliar network resource to segregate the enterprise data based on a mobile device management protocol.

15. The computer-implemented method of claim 9, further comprising:
preventing disclosure of the enterprise data via a first disclosure mechanism that corresponds to the disclosure request; and
providing instructions associated with a second disclosure mechanism that are different than the first disclosure mechanism to enable the enterprise data to be disclosed via the second disclosure mechanism.

16. A computer-readable storage medium having computer-executable instructions stored thereupon which, when executed by one or more processors of a computing device, cause the one or more processors of the computing device to:
obtain security policy data defining permissions for a plurality of computing resources that are configured to communicate enterprise data via an enterprise network;
analyze a request to identify a particular computing resource that is attempting to disclose the enterprise data outside of the enterprise network, or access the enterprise data from the enterprise network, or both, wherein the particular computing resource is a uniquely identifiable application or device that enables a user to at least one of view data files or manipulate the data files;
determine that the security policy data lacks at least one of:
particular disclosure permissions that expressly permit the particular computing resource to disclose the enterprise data outside of the enterprise network, or
particular access permissions that expressly permit the particular computing resource to access the enterprise data from the enterprise network;
designate the particular computing resource as an unfamiliar computing resource based on the security policy data lacking the particular disclosure permissions or the particular access permissions for the particular computing resource;
determine that a delivery mechanism through which the unfamiliar computing resource was delivered to the computing device corresponds to one or more trusted delivery mechanisms associated with the enterprise network; and
permit, based on the delivery mechanism corresponding to the one or more trusted delivery mechanisms, the request to enable the unfamiliar computing resource to disclose the enterprise data outside of the enterprise network, or access the enterprise data from the enterprise network, or both.

17. The computer-readable storage medium of claim 16, wherein the instructions further cause the one or more processors of the computing device to:
cause an entry that identifies the unfamiliar computing resource to be added to a policy learning log to indicate that the security policy data does not define the particular access permissions for the particular computing resource; and
provide a policy gap notification that corresponds to the entry to a policy management service to prompt policy adjudication for the particular computing resource.

18. The computer-readable storage medium of claim 16, wherein the instructions further cause the one or more processors of the computing device to automatically update the security policy data to include the particular disclosure permissions or the particular access permissions for the particular computing resource in response to the delivery mechanism corresponding to the one or more trusted delivery mechanisms.

19. The computer-readable storage medium of claim 16, wherein the instructions further cause the one or more processors of the computing device to designate the particular computing resource as exempt from application of the permissions defined by the security policy data in response to the delivery mechanism corresponding to the one or more trusted delivery mechanisms.

20. The computer-readable storage medium of claim 16, wherein the delivery mechanism includes the unfamiliar computing resource being delivered to the computing device in response to a user input that selects a link on a webpage of the enterprise network.

\* \* \* \* \*